United States Patent
Onodera et al.

(10) Patent No.: US 8,249,179 B2
(45) Date of Patent: Aug. 21, 2012

(54) COMMUNICATION APPARATUS, MULTICARRIER COMMUNICATION SYSTEM AND COMMUNICATION METHOD

(75) Inventors: Takashi Onodera, Osaka (JP); Yasuhiro Hamaguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 248 days.

(21) Appl. No.: 12/739,707

(22) PCT Filed: Oct. 8, 2008

(86) PCT No.: PCT/JP2008/068273
§ 371 (c)(1),
(2), (4) Date: May 25, 2010

(87) PCT Pub. No.: WO2009/054264
PCT Pub. Date: Apr. 30, 2009

(65) Prior Publication Data
US 2010/0260277 A1 Oct. 14, 2010

(30) Foreign Application Priority Data
Oct. 25, 2007 (JP) .................................. 2007-277443

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl. ........ 375/260; 375/346; 375/316; 370/252; 370/329; 370/330; 370/468; 455/452.2; 455/452.1

(58) Field of Classification Search .................. 375/260, 375/346, 316; 370/252, 329, 330, 468; 455/452.2, 455/452.1
See application file for complete search history.

(56) References Cited

U.S. PATENT DOCUMENTS
6,836,484 B2 12/2004 Suzuki
(Continued)

FOREIGN PATENT DOCUMENTS
JP 2001-238269 A 8/2001
(Continued)

OTHER PUBLICATIONS

Kishiyama, et al. "Experimental Evaluations of Adaptive Modulation and Channel Coding in Forward Link for VSF-OFCDM Broadband Wireless Access", IEICE Technical Report, May 2003, RCS2003-25, pp. 7-14.

(Continued)

*Primary Examiner* — Phuong Phu
(74) *Attorney, Agent, or Firm* — Birch, Stewart, Kolasch & Birch, LLP

(57) ABSTRACT

To efficiently perform adaptive modulation and adaptive scheduling in a communication control apparatus, while suppressing the total notified amount of reception quality information, provided is a communication terminal apparatus 300 which is applied to a multicarrier communication scheme in which the apparatus receives a signal on a channel allocated by a communicating party among a plurality of channels each comprised of at least one subcarrier, measures reception quality of the received signal, and notifies the communicating party of reception quality information, and has a reception quality measuring section 308 that measures reception quality of each subcarrier, and a reception quality information generating section 309 which determines an allocation request degree of each channel with respect to the communicating party, selects an information amount to represent reception quality information for each channel based on the allocation request degree, and based on the measured reception quality, generates the reception quality information represented by the selected information amount.

11 Claims, 23 Drawing Sheets

U.S. PATENT DOCUMENTS

| | | | |
|---|---|---|---|
| 7,215,927 B2 | 5/2007 | Miyoshi | |
| 7,764,647 B2 * | 7/2010 | Nogami et al. | 370/329 |
| 7,813,291 B2 * | 10/2010 | Yoon et al. | 370/252 |
| 7,916,688 B2 * | 3/2011 | Kaneko et al. | 370/328 |
| 7,983,351 B2 * | 7/2011 | Motoyoshi et al. | 375/260 |
| 8,116,216 B2 * | 2/2012 | Nogami et al. | 370/252 |
| 2001/0024427 A1 | 9/2001 | Suzuki | |
| 2006/0089102 A1 | 4/2006 | Nishio et al. | |
| 2006/0116078 A1 | 6/2006 | Miyoshi | |
| 2006/0221807 A1 * | 10/2006 | Fukuoka et al. | 370/203 |
| 2007/0015469 A1 * | 1/2007 | Cho et al. | 455/69 |
| 2007/0140102 A1 | 6/2007 | Oh et al. | |
| 2007/0232341 A1 * | 10/2007 | Sakata | 455/509 |
| 2007/0237167 A1 * | 10/2007 | Kaneko et al. | 370/437 |
| 2007/0258366 A1 | 11/2007 | Imamura | |
| 2008/0152028 A1 | 6/2008 | Futaki et al. | |
| 2009/0104877 A1 | 4/2009 | Nishio et al. | |
| 2011/0170446 A1 * | 7/2011 | Li et al. | 370/252 |

FOREIGN PATENT DOCUMENTS

| | | | |
|---|---|---|---|
| JP | 2004-128661 A | 4/2004 | |
| JP | 2004-208234 A | 7/2004 | |
| JP | 2005-73259 A | 3/2005 | |
| JP | 2006-50545 A | 2/2006 | |
| JP | 2007-166118 A | 6/2007 | |
| JP | 2007-205119 A | 8/2007 | |
| JP | 2008-283475 A | 11/2008 | |
| WO | WO-2004/059891 A1 | 7/2004 | |
| WO | WO-2006/049123 A1 | 5/2006 | |
| WO | WO-2006/059566 A1 | 6/2006 | |

OTHER PUBLICATIONS

Maehara, et al. "On OFDM/TDD Transmission Scheme with Subcarrier Adaptive Modulation", IEICE General Conference, Mar. 2001, B-5-100, pp. 498.

"CQI report and scheduling procedure", 3GPP, TSG-RAN WG1 Meeting #42bis, R1-051045, Oct. 2005.

"Sensitivity of DL/UL Performance to CQI-Compression with Text Proposal", 3GPP, TSG-RAN WG1 ad hoc meeting on LTE, R1-060228, Jan. 2006.

Mitsubishi Electric, Selection of CQI reporting scheme, 3GPP TSG RAN WG1 #50bis Tdoc R1-073933, Oct. 8-12, 2007, pp. 1-7.

LG Electronics, DCT based CQI reporting scheme, 3GPP TSG RAN WG1 LTE Ad Hoc, R1-061777, Jun. 27-30, 2006, pp. 1-11.

Ericsson, E-UTRA Incremental CQI Reporting Using DCT Coding, TSG-RAN WG1 #46, R1-062278. 2006.09. 01 LG Electronics, "DCT based CQI reporting scheme", 3GPP TSG RAN WG1 LTE Ad Hoc, R1-061777.

* cited by examiner

FIG.9A

| RECEPTION QUALITY INFORMATION | DIFFERENCE VALUE D1 | DIFFERENCE VALUE D2 | DIFFERENCE VALUE D3 |
|---|---|---|---|
| 0 | 0 | ±0 | +1 |
| 1 | +1 | +1 | −1 |
| 2 | +2 | −2 | |
| 3 | +3 | −1 | |
| 4 | −4 | | |
| 5 | −3 | | |
| 6 | −2 | | |
| 7 | −1 | | |

FIG.9B

| RECEPTION QUALITY INFORMATION | DIFFERENCE VALUE D1 | DIFFERENCE VALUE D2 | DIFFERENCE VALUE D3 |
|---|---|---|---|
| 0 | ±0 | ±0 | +2 |
| 1 | +1 | +2 | −2 |
| 2 | +2 | −4 | |
| 3 | +3 | −2 | |
| 4 | −4 | | |
| 5 | −3 | | |
| 6 | −2 | | |
| 7 | −1 | | |

FIG.9C

| RECEPTION QUALITY INFORMATION | DIFFERENCE VALUE D1 | DIFFERENCE VALUE D2 | DIFFERENCE VALUE D3 |
|---|---|---|---|
| 0 | −7 | −3 | −1 |
| 1 | −5 | −1 | +1 |
| 2 | −3 | +1 | |
| 3 | −1 | +3 | |
| 4 | +1 | | |
| 5 | +3 | | |
| 6 | +5 | | |
| 7 | +7 | | |

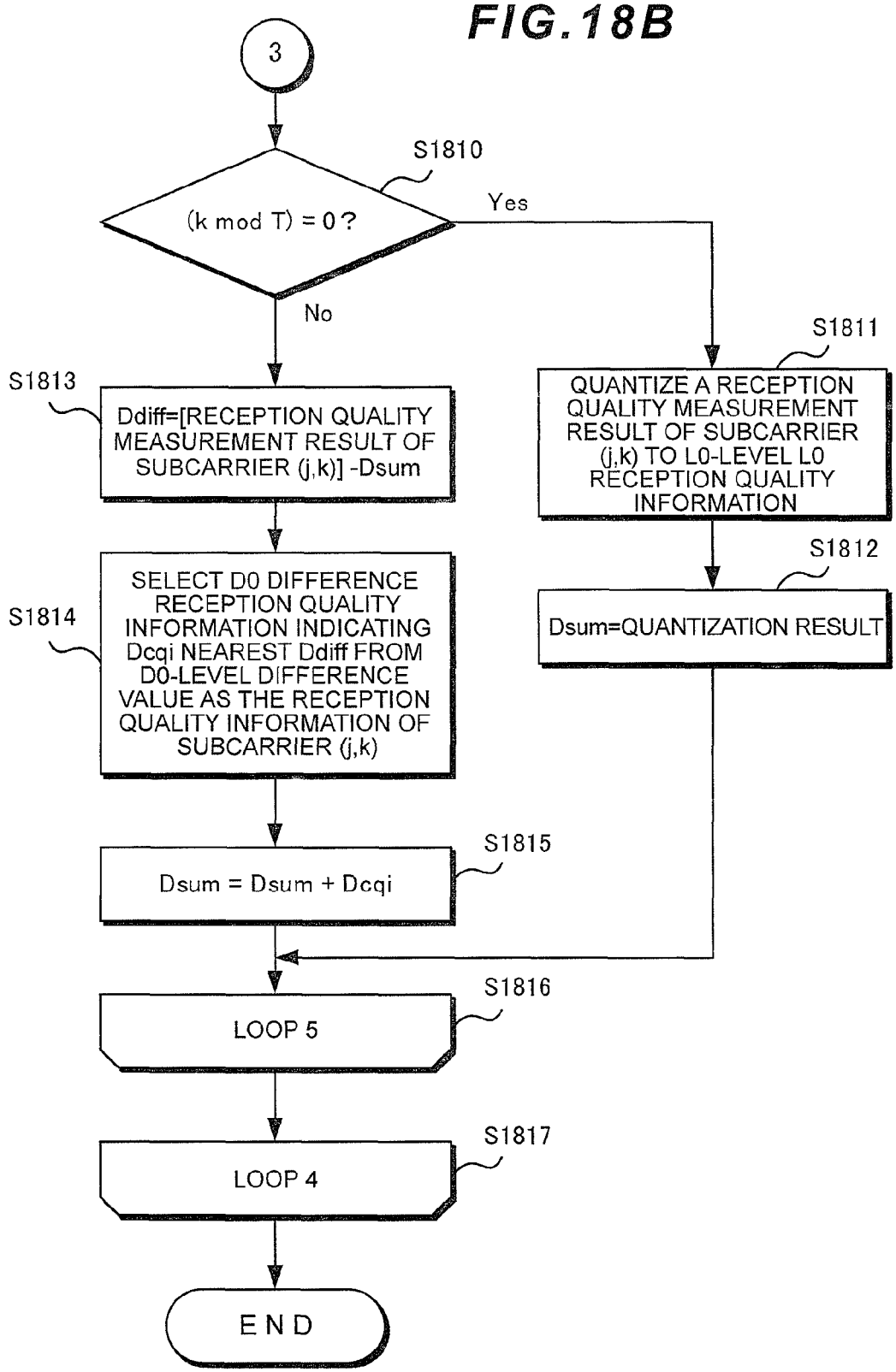

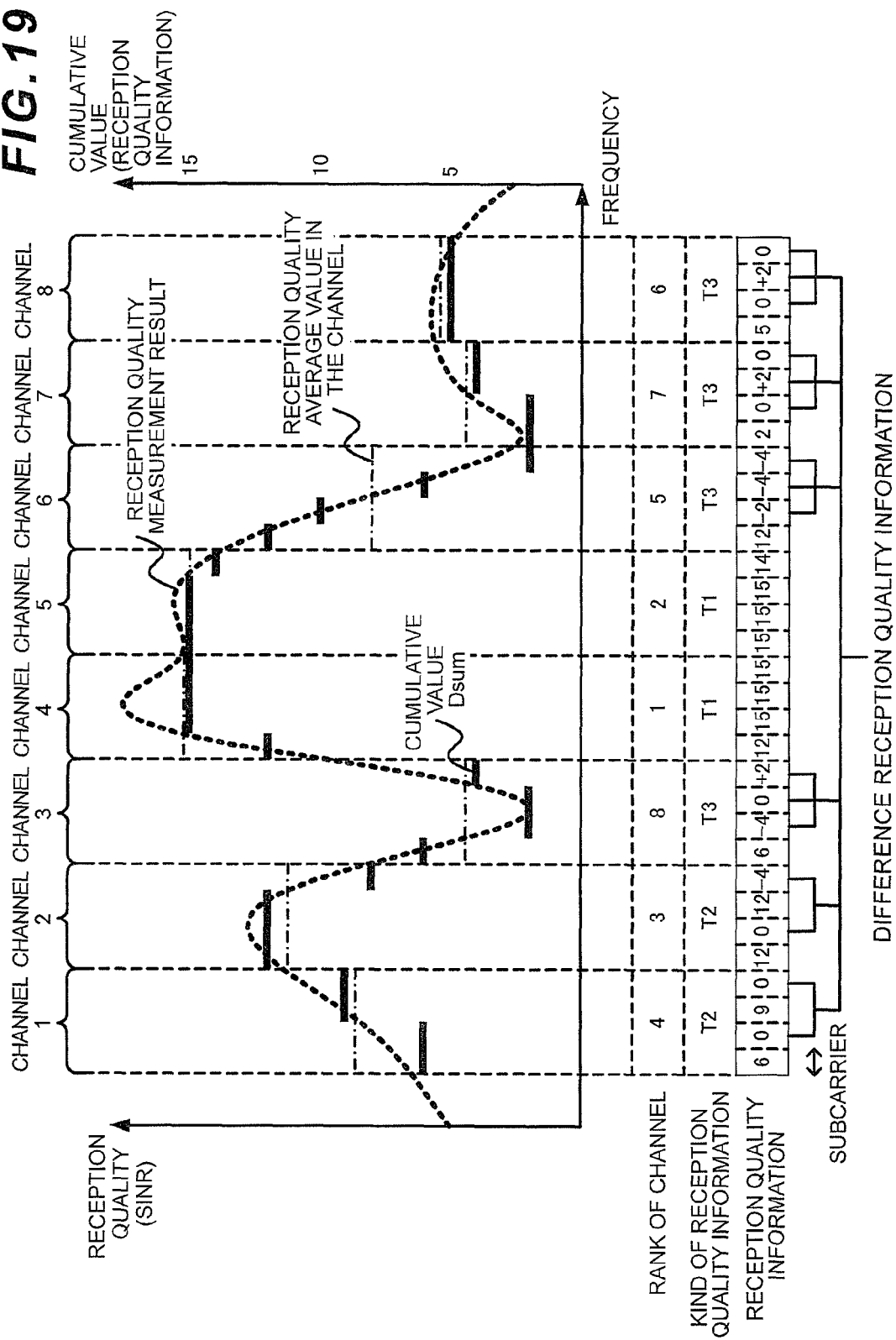

COMMUNICATION APPARATUS, MULTICARRIER COMMUNICATION SYSTEM AND COMMUNICATION METHOD

TECHNICAL FIELD

The present invention relates to a communication apparatus for measuring reception quality of each channel from a received signal to notify a communicating party of the result, multicarrier communication system and communication method

BACKGROUND ART

Conventionally, methods have been considered to improve substantial transmission speed in consideration of communication efficiency i.e. total throughput of the system and occurrence of reception error. For example, such a scheme is proposed that communication parameters such as a modulation scheme, channel coding rate, error correcting coding scheme, spreading factor, the number of multiplexed codes, transmission power, etc. are adaptively selected based on an indicator indicating propagation path conditions and reception quality such as, for example, received signal power and SINR (Signal to Interference plus Noise power Ratio) (Non-patent Document 1). Particularly, the scheme for adaptively selecting modulation parameters such as a modulation scheme, channel coding rate, etc. is called the adaptive modulation scheme.

Further, following schemes have been considered in a communication system comprised of a base station apparatus and a plurality of communication terminal apparatuses where multicarrier communication is used in communications (downlink) from the base station apparatus to the communication terminal apparatuses (Non-patent Documents 2 and 3):

(1) scheduling for allocating a channel to each communication terminal apparatus is performed corresponding to reception quality of each channel in a downlink signal of each communication terminal apparatus; and (2) further, adaptive modulation is performed in the downlink for each channel comprised of a single subcarrier or some subcarriers.

In addition, in the communication system that adopts scheduling and adaptive modulation scheme based on the reception quality of the communication terminal apparatus, in order to determine allocation and modulation parameters, it is necessary to notify the communicating party of an indicator such as received signal power and SINR of a channel used in communications indicating propagation path conditions and reception quality.

In the above-mentioned system, each communication terminal apparatus is required to notify the base station apparatus of reception quality information concerning each channel using an uplink control channel and the like. Therefore, there is a problem that the information amount of reception quality information transmitted on uplink becomes enormous in proportion to the number of communication terminal apparatuses and the number of channels. Then, to improve the aforementioned problem, techniques are proposed for the purpose of reducing the information amount of reception quality information transmitted on uplink (Patent Documents 1 and 2, and Non-patent Documents 3 and 4).

(1) A method where each communication terminal apparatus measures reception quality of all the channels that the base station apparatus allocates to each communication terminal apparatus for communications for each communication terminal apparatus, and notifies the base station apparatus of only an average value of the reception quality of all the channels (first measure).

(2) A method where each communication terminal apparatus selects the predetermined number of channels providing excellent reception quality in descending order of the reception quality from all the channels that the base station apparatus allocates to each communication terminal apparatus for communications, and notifies the base station apparatus of only the reception quality of the selected channels (second measure).

(3) A method where each communication terminal apparatus selects some reference channels from all the channels that the base station apparatus allocates to each communication terminal apparatus for communications, represents a value of reception quality of each channel using a difference value from the reception quality of the reference channel, and notifies the base station apparatus of the difference value (third measure).

Patent Document 1: Japanese Laid-Open Patent Publication No. 2004-208234

Patent Document 2: Japanese Laid-Open Patent Publication No. 2006-50545

Non-patent Document 1: Kishiyama, et al. "Experimental Evaluations of Adaptive Modulation and Channel Coding in Forward Link for VSF-OFCDM Broadband Wireless Access", IEICE Technical Report, 2003, May, RCS2003-25

Non-patent Document 2: Maehara, et al. "On OFDM/TDD Transmission Scheme with Subcarrier Adaptive Modulation", IEICE General Conference, 2001, March, B-5-100, p. 498

Non-patent Document 3: "CQI report and scheduling procedure", 3GPP, TSG-RAN WG1 Meeting #42bis, R1-051045, 2005, October Non-patent Document 4: "Sensitivity of DL/UL Performance to CQI-Compression with Text Proposal", 3GPP, TSG-RAN WG1 ad hoc meeting on LTE, R1-060228, 2006, January

DISCLOSURE OF INVENTION

Problems to be Solved by the Invention

However, following problems exist in the above-mentioned conventional techniques. In other words, adaptive modulation corresponding to reception quality of each channel cannot be performed in the first measure. Therefore, the transmission rate is excessively low on channels with reception quality higher than the average value and becomes inefficient, while error-rate characteristics deteriorate on channels with reception quality lower than the average value. Further, it is not possible to perform scheduling for allocating channels providing respective excellent reception quality to communication terminal apparatuses using frequency selectivity of propagation paths, and transmission efficiency thereby degrades in the entire system.

Further, as in the second measure, in the method of notifying the predetermined number of channels with excellent reception quality among channels, when the predetermined number of channels with excellent reception quality notified from a plurality of communication terminal apparatuses overlap one another, there is a possibility of occurrence of a communication terminal apparatus to which a channel such that the reception quality is notified is not allocated as a result of scheduling. In this case, since reception quality of other channels of the communication terminal apparatus is absolutely uncertain, it is not possible to perform scheduling and adaptive modulation based on the reception quality of the communication terminal apparatus in a vacant channel, and transmission efficiency deteriorates.

Furthermore, in the third measure, even for a channel with poor reception quality and thus a low possibility of being allocated to the communication terminal apparatus, since the reception quality information is notified using the same information amount as that of a channel with excellent reception quality requested to allocate, large amounts of information are notified unnecessarily, and are sometimes inefficient.

The present invention was made in view of such circumstances, and it is an object of the invention to provide a communication apparatus, multicarrier communication system and communication method for enabling a communication control apparatus to efficiently perform adaptive modulation and adaptive scheduling, while suppressing the total notified amount of reception quality information.

Means for Solving the Problem (1) To attain the above-mentioned object, the invention took measures as described below. In other words, a communication apparatus of the invention is a communication apparatus applied to a multicarrier communication scheme in which the apparatus receives a signal on a channel allocated by a communicating party among a plurality of channels each comprised of at least one subcarrier, measures reception quality of the received signal, and notifies the communicating party of reception quality information, and is characterized by having a reception quality measuring section that measures reception quality of each subcarrier, and a reception quality information generating section which determines an allocation request degree of each channel with respect to the communicating party, selects an information amount to represent the reception quality information for each channel based on the allocation request degree, and based on the measured reception quality, generates the reception quality information represented by the selected information amount.

Thus, an allocation request degree is determined, an information amount to represent the reception quality information is selected for each channel based on the allocation request degree, the reception quality information represented by the selected information amount is generated based on the measured reception quality, it is thereby possible to suppress the total information amount of the reception quality information, and it is concurrently possible to efficiently perform adaptive modulation and adaptive scheduling in a communication control apparatus (for example, base station apparatus).

(2) Further, in the communication apparatus of the invention, the reception quality information generating section is characterized by having a request degree determining section that determines the allocation request degree of each channel with respect to the communicating party based on the measured reception quality, and a selection generating section which selects an information amount to represent the reception quality information for each channel based on the allocation request degree, and generates the reception quality information represented by the selected information amount based on a measurement result of the reception quality for each subcarrier group comprised of at least one subcarrier belonging to each channel.

Thus, an allocation request degree is determined, an information amount to represent the reception quality information is selected for each channel based on the allocation request degree, the reception quality information represented by the selected information amount is generated based on a measurement result of the reception quality for each subcarrier group comprised of at least one subcarrier belonging to each channel, it is thereby possible to suppress the total information amount of the reception quality information, and it is concurrently possible to efficiently perform adaptive modulation and adaptive scheduling in a communication control apparatus (for example, base station apparatus).

(3) Further, in the communication apparatus of the invention, it is a feature that the reception quality information generating section has a reception quality averaging section that calculates either one of an average value, a median value, a mode and a minimum value of reception quality measurement results of all subcarriers belonging to each channel, and that the request degree determining section increases the allocation request degree of each channel as the average value, the median value, the mode or the minimum value is higher.

Thus, the allocation request degree of each channel is increased as the average value, the median value, the mode or the minimum value is higher, and it is thereby possible to perform high-speed communications by efficient scheduling and adaptive modulation in the communication control apparatus as the allocation request degree is higher.

(4) Further, in the communication apparatus of the invention, the selection generating section is characterized by generating reception quality information with a larger information amount for a channel such that the allocation request degree is higher.

Thus, reception quality information with a larger information amount is generated for a channel with a higher allocation request degree, and the communication control apparatus is thereby capable of performing high-speed communications by efficient scheduling and adaptive modulation based on more detailed reception quality information for a channel with a higher allocation request degree. Meanwhile, by generating reception quality information with a smaller information amount for a channel with a lower allocation request degree, it is possible to suppress the total information amount. In this case, even when the communication control apparatus has to allocate a channel with a low allocation request degree in the communication terminal apparatus, the communication control apparatus is able to perform scheduling and adaptive modulation based on rough reception quality information in the communication terminal apparatus, and it is thereby possible to avoid deterioration of transmission efficiency that would occur in the case of not notifying any reception quality information of channels of which reception quality is not excellent.

(5) Further, in the communication apparatus of the invention, the selection generating section is characterized by increasing the number of bits per subcarrier group for a channel such that the allocation request degree is higher, and generating the reception quality information by quantizing the measurement result of the reception quality corresponding to the number of bits.

Thus, as the allocation request degree is higher, the number of bits per subcarrier group is increased, the reception quality information is generated by quantizing the measurement result of the reception quality corresponding to the number of bits, and the communication control apparatus is thereby capable of performing high-speed communications by efficient scheduling and adaptive modulation based on more detailed reception quality information for a channel with a higher allocation request degree. Meanwhile, the number of bits per subcarrier group is decreased for a channel with a lower allocation request degree, the reception quality information is generated by quantizing the measurement result of the reception quality corresponding to the number of bits, and it is thereby possible to suppress the total information amount. In this case, even when the communication control apparatus has to allocate a channel with a low allocation request degree in the communication terminal apparatus, the communication control apparatus is able to perform scheduling and adaptive modulation based on rough reception quality information in the communication terminal apparatus, and it is thereby possible to avoid deterioration of transmission efficiency that would occur in the case of not notifying any reception quality information of channels of which reception quality is not excellent.

(6) Further, in the communication apparatus of the invention, as the reception quality information, the selection generating section is characterized by generating non-difference reception quality information by quantizing the measurement result of the reception quality for at least one beforehand determined subcarrier group, and for the other subcarrier groups, generating difference reception quality information indicating a difference value from an adjacent subcarrier group in the measurement result of the reception quality using the higher number of bits as the allocation request degree of a channel to which the subcarrier groups belong is higher.

Thus, as the reception quality information, non-difference reception quality information is generated by quantizing the measurement result of the reception quality for at least one predetermined subcarrier group, difference reception quality information indicating a difference value from the adjacent subcarrier group in the measurement result of the reception quality is generated using the higher number of bits as the channel allocation degree of a channel to which the subcarrier group belongs is higher for the other subcarrier groups, and it is thereby possible to suppress the total information amount of reception quality information. Further, the communication control apparatus is capable of performing high-speed communications by efficient scheduling and adaptive modulation based on more detailed reception quality information for a channel with a higher allocation request degree. Meanwhile, since the difference reception quality information that indicates a difference value is generated using the lower number of bits for a channel with a lower allocation request degree, even when the communication control apparatus has to allocate a channel with a low allocation request degree in the communication terminal apparatus, the communication control apparatus is able to perform scheduling and adaptive modulation based on rough reception quality information in the communication terminal apparatus, and it is thereby possible to avoid deterioration of transmission efficiency that would occur in the case of not notifying any reception quality information of channels of which reception quality is not excellent.

(7) Further, in the communication apparatus of the invention, the selection generating section is characterized by generating, as the reception quality information, the non-difference reception quality information obtained by quantizing the measurement result of the reception quality and the difference reception quality information indicating a difference value from an adjacent subcarrier group in the measurement result of the reception quality for each subcarrier group, and selecting the higher number of subcarrier groups to generate the non-difference reception quality information for a channel such that the allocation request degree is higher.

Thus, generated as the reception quality information is the non-difference reception quality information obtained by quantizing the measurement result of the reception quality and the difference reception quality information indicating a difference value from an adjacent subcarrier group in the measurement result of the reception quality for each subcarrier group, the higher number of subcarrier groups is selected to generate the non-difference reception quality information for a channel with a higher allocation request degree, and it is thereby possible to suppress the total information amount of reception quality information. Further, the communication control apparatus is capable of performing high-speed communications by efficient scheduling and adaptive modulation based on more detailed reception quality information for a channel with a higher allocation request degree. Meanwhile, since the number of subcarrier groups to generate the non-difference reception quality information is decreased for a channel with a lower allocation request degree, even when the communication control apparatus has to allocate a channel with a low allocation request degree in the communication terminal apparatus, the communication control apparatus is able to perform scheduling and adaptive modulation based on rough reception quality information in the communication terminal apparatus, and it is thereby possible to avoid deterioration of transmission efficiency that would occur in the case of not notifying any reception quality information of channels of which reception quality is not excellent.

(8) Further, in the communication apparatus of the invention, the selection generating section is characterized by making the number of bits representing the difference reception quality information lower than the number of bits representing the non-difference reception quality information.

Thus, the number of bits representing the difference reception quality information is made lower than the number of bits representing the non-difference reception quality information, and it is thereby possible to decrease the total information amount.

(9) Further, a multicarrier communication system of the invention is a multicarrier communication system comprised of a communication control apparatus that allocates a channel to a communication terminal apparatus from among a plurality of channels each comprised of at least one subcarrier, and the communication terminal apparatus that receives a signal on the channel allocated by the communication control apparatus, measures reception quality of the received signal, and notifies the communication control apparatus of reception quality information, and is characterized in that the communication terminal apparatus measures reception quality of each subcarrier, determines an allocation request degree of each channel with respect to the communication control apparatus, selects an information amount to represent the reception quality information for each channel based on the allocation request degree, generates the reception quality information represented by the selected information amount based on a measurement result of the reception quality for each subcarrier group comprised of at least one subcarrier belonging to each channel, and notifies the communication control apparatus of the generated reception quality information.

Thus, an allocation request degree is determined, an information amount to represent the reception quality information is selected for each channel based on the allocation request degree, the reception quality information represented by the selected information amount is generated based on the measured result of the reception quality for each subcarrier group comprised of at least one subcarrier belonging to each channel, it is thereby possible to suppress the total information amount of the reception quality information, and it is concurrently possible to efficiently perform adaptive modulation and adaptive scheduling in the communication control apparatus.

(10) Further, a communication method of the invention is a communication method in a multicarrier communication system comprised of a communication control apparatus that allocates a channel to a communication terminal apparatus from among a plurality of channels each comprised of at least one subcarrier, and the communication terminal apparatus that receives a signal on the channel allocated by the communication control apparatus, measures reception quality of the received signal, and notifies the communication control apparatus of reception quality information, and is characterized in that the communication terminal apparatus measures reception quality of each subcarrier, determines an allocation request degree of each channel with respect to the communicating control apparatus, selects an information amount to represent the reception quality information for each channel based on the allocation request degree, generates the reception quality information represented by the selected information amount based on a measurement result of the reception quality for each subcarrier group comprised of at least one subcarrier belonging to each channel, and notifies the communication control apparatus of the generated reception quality information.

Thus, an allocation request degree is determined, an information amount to represent the reception quality information is selected for each channel based on the allocation request degree, the reception quality information represented by the selected information amount is generated based on the measured result of the reception quality for each subcarrier group comprised of at least one subcarrier belonging to each channel, it is thereby possible to suppress the total information amount of the reception quality information, and it is concurrently possible to efficiently perform adaptive modulation and adaptive scheduling in the communication control apparatus.

Advantageous Effect of the Invention

According to the invention, a communication terminal apparatus determines an allocation request degree, selects an information amount to represent the reception quality information for each channel based on the allocation request degree, and generates the reception quality information represented by the selected information amount, it is thereby possible to suppress the total information amount of the reception quality information, and it is concurrently possible to efficiently perform adaptive modulation and adaptive scheduling in a communication control apparatus (for example, base station apparatus).

BRIEF DESCRIPTION OF DRAWINGS

FIG. 9A is a diagram showing an example of a correspondence between the reception quality information and a difference value when D1=8 (b1'=3), D2=4 (b2'=2) and D3=2 (b3'=1);

FIG. 9B is a diagram showing another example of the correspondence between the reception quality information and a difference value when D1=8 (b1'=3), D2=4 (b2'=2) and D3=2 (b3'=1);

FIG. 9C is a diagram showing still another example of the correspondence between the reception quality information and a difference value when D1=8 (b1'=3), D2=4 (b2'=2) and D3=2 (b3'=1);

FIG. 18B is another flowchart showing the example of operation of reception quality information generation in the reception quality generating section (and the reception quality measuring section);

FIG. 19 is a diagram showing an example of generation results of reception quality information in Embodiment 3.

DESCRIPTION OF SYMBOLS

Figure 1:
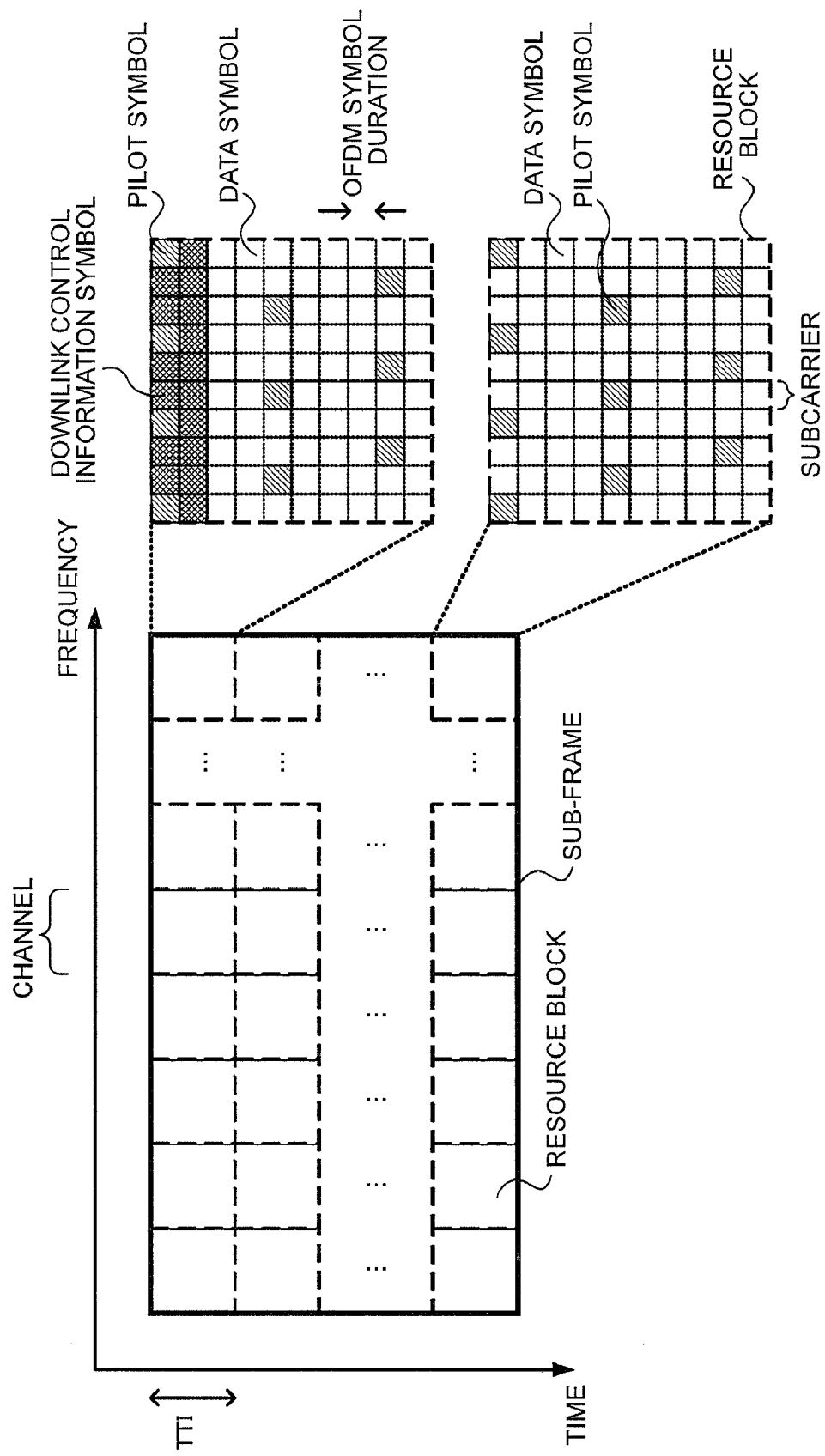
FIG. 1 is a diagram showing an example of a sub-frame structure in the downlink in Embodiment 1.

200, 900, 1500 Base station apparatus
201 Transmission buffer section
202 Coding section
203 Mapping section 204 Frequency time transform section
205 GI inserting section
206 D/A conversion section
207 Radio transmission section
208 Antenna section
209 Radio reception section
210 A/D conversion section
211 Demapping section
212 Decoding section
213 Reception quality information storing section
214 Scheduling section
215 Downlink control information generating section
216 Pilot generating section
300, 1000, 1600 Communication terminal apparatus
301 Antenna section
302 Radio reception section
303 A/D conversion section
304 GI removing section
305 Time frequency transform section
306 Demapping section
307 Decoding section
308 Reception quality measuring section
309 Reception quality information generating section
310 Coding section
311 Mapping section
312 D/A conversion section
313 Radio transmission section
314 Demodulation control section
341, 1041 Reception quality averaging section
342, 1042 Request degree determining section
343, 1044, 1644 Selection generating section
913, 1513 Reception quality information storing section
1009, 1609 Reception quality information generating section
1043, 1643 Subtraction section
1045, 1645 Accumulating section

BEST MODE FOR CARRYING OUT THE INVENTION

Embodiments according to the invention will be described below with reference to drawings. Described below are the Embodiments where the invention is applied to a cellular system which adopts an Orthogonal Frequency Division Multiple Access (hereinafter, referred to as "OFDMA") system that is a multiple access system using Orthogonal Frequency Division Multiplex (OFDM) where adaptive scheduling (channel allocation) is performed for each channel comprised of at least one subcarrier, and adaptive modulation is performed for each channel.

In addition, in the following description of each Embodiment, as reception quality information, the description is given using an indicator, for example, SINR (Signal to Interference plus Noise power Ratio) which is calculated based on a pilot symbol.

Embodiment 1

FIG. 1 is a diagram showing an example of a sub-frame structure in the downlink in this Embodiment. As shown in FIG. 1, a channel in this Embodiment means one or a plurality of subcarriers. Further, the subcarrier is assumed to mean a transmission unit, and to be the range in which channel allocation is performed in a single time of scheduling processing. Furthermore, a sub-frame is divided into T (T is a natural number) by a predetermined time interval TTI (Transmission Time Interval) in the time-axis direction, and one TTI in a channel is assumed to be a unit (hereafter, referred to as a "resource block (RE)") for scheduling. Described herein is a case where each communication terminal apparatus reports downlink reception quality to a base station apparatus for each subcarrier, and the base station apparatus performs scheduling on downlink data to each communication terminal apparatus on a resource-block basis as a unit, and further performs adaptive modulation on the resource block for each subcarrier.

In addition, the scope of application of the invention is not limited to the sub-frame structure as shown in FIG. 1, and the invention is applicable to systems to perform communications using a plurality of channels with a possibility that reception quality of each channel may differ in each communication terminal apparatus.

Figure 2:
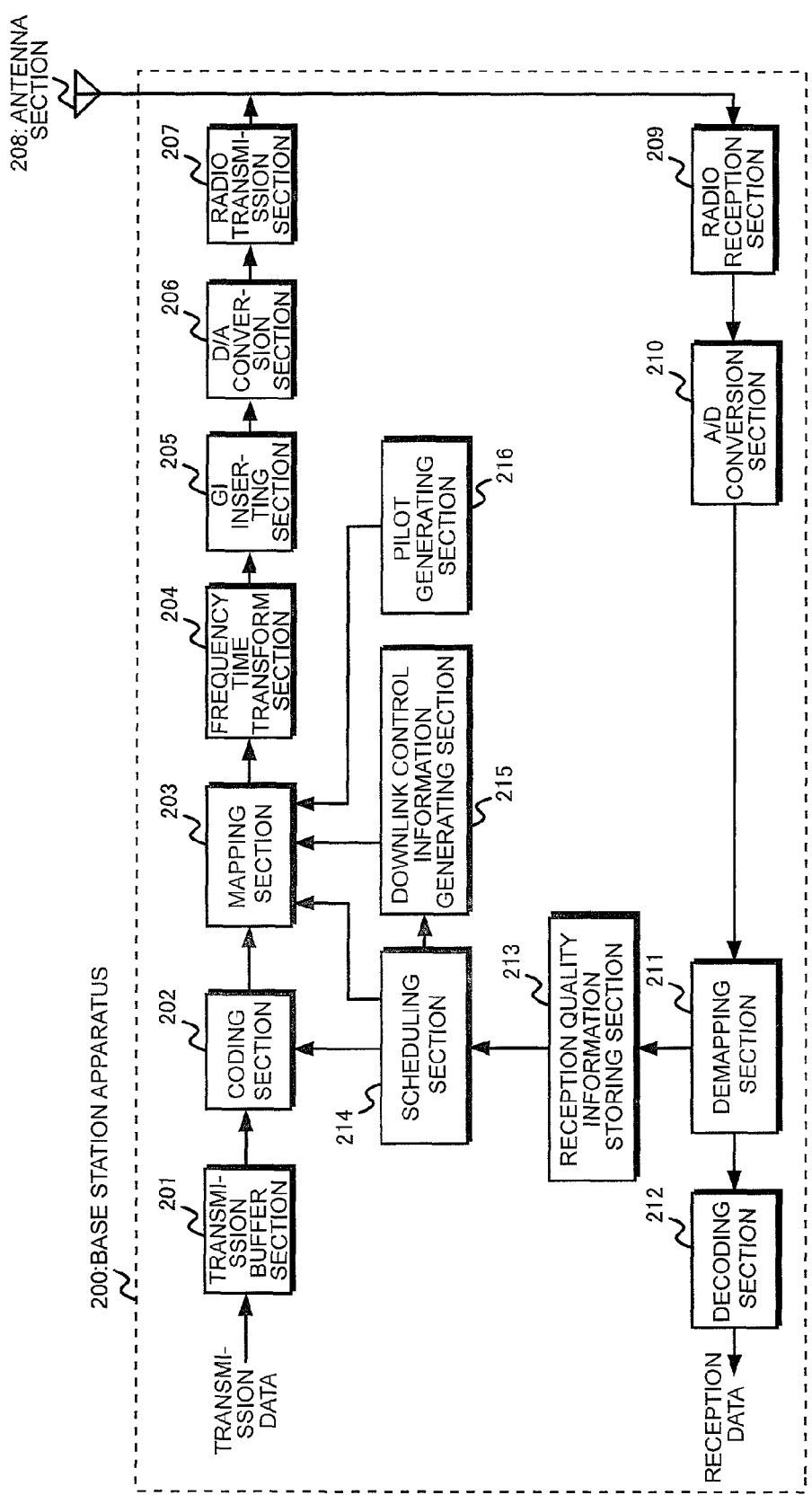
FIG. 2 is a block diagram showing a schematic configuration of a base station apparatus in Embodiment 1.
Figure 3:
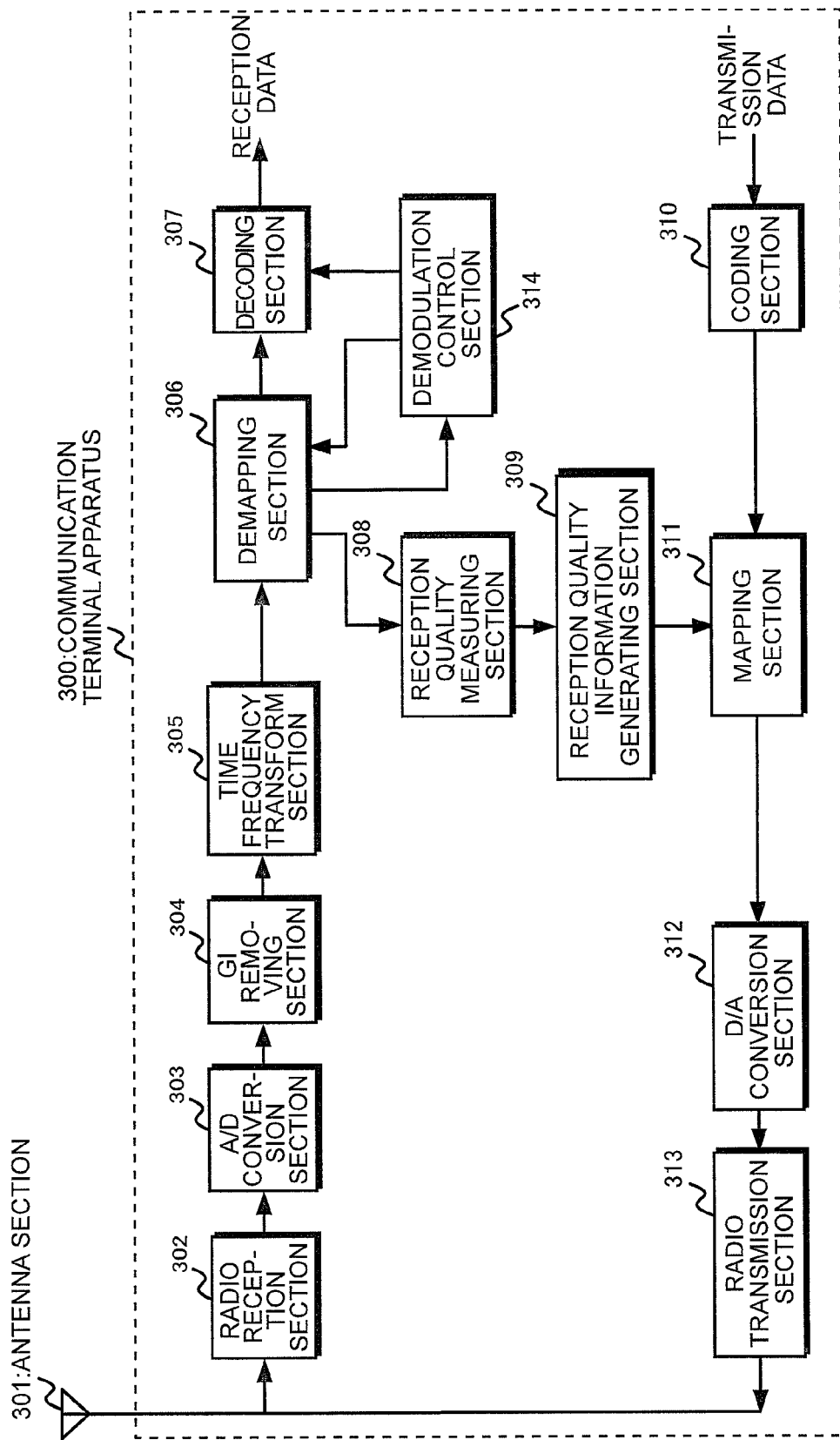
FIG. 3 is a block diagram showing a schematic configuration of a communication terminal apparatus in Embodiment 1.

FIG. 2 is a block diagram showing a schematic configuration of a base station apparatus 200 in this Embodiment. FIG. 3 is a block diagram showing a schematic configuration of a communication terminal apparatus 300 in this Embodiment. In FIG. 2, the base station apparatus 200 has a transmission buffer section 201, coding section 202, mapping section 203, frequency time transform section 204, GI (Guard Interval) inserting section 205, D/A (Digital-to-Analog) conversion section 206, radio transmission section 207, antenna section 208, radio reception section 209, A/D (Analog-to-Digital) conversion section 210, demapping section 211, decoding section 212, scheduling section 214, downlink control information generating section 215, pilot generating section 216, and reception quality information storing section 213.

In FIG. 3, the communication terminal apparatus 300 has an antenna section 301, radio reception section 302, A/D conversion section 303, GI removing section 304, time frequency transform section 305, demapping section 306, decoding section 307, reception quality measuring section 308, reception quality information generating section 309, coding section 310, mapping section 311, D/A conversion section 312, radio transmission section 313, and demodulation control section 314.

Referring to FIGS. 2 and 3, described first are procedures by which the base station apparatus 200 transmits a downlink signal, and the communication terminal apparatus 300 receives the downlink signal. In FIG. 2, the transmission buffer section 201 stores input transmission data in a buffer for each destination communication terminal apparatus, and outputs the stored transmission data to the coding section 202 in response to a request from the coding section 202.

The scheduling section 214 reads reception quality information notified from each communication terminal apparatus stored in the reception quality information storing section 213. Then, based on the information, the scheduling section 214 allocates (schedules) the communication terminal apparatus to each resource block of each channel, and selects modulation parameters respectively used in subcarriers in the resource block. Then, the section 214 outputs the scheduling result (scheduling information) and modulation parameter selection result (modulation parameter information). Scheduling may be performed further based on transmission data amount information from the transmission buffer section 201.

The downlink control information generating section 215 generates downlink control information including the scheduling information and modulation parameter information from the scheduling section 214. The coding section 202 reads a required amount of transmission data to be sent to each communication terminal apparatus from the transmission buffer section 201 according to the allocation information (scheduling information) of each communication terminal apparatus on downlink notified from the scheduling section 214, further performs error correcting coding processing on the transmission data to each communication terminal apparatus according to the modulation parameter information and scheduling information notified from the scheduling section 214, and generates a data sequence to output.

The pilot generating section 216 generates and outputs a pilot sequence to be inserted in a transmission signal for the communication terminal apparatus to measure the reception quality. The mapping section 203 maps each bit of the data sequence to a modulation symbol on a subcarrier based on the modulation parameter information and scheduling information notified from the scheduling section 214, while performing mapping of the downlink control information and pilot sequence generated in the pilot generating section 216 to predetermined modulation symbols on predetermined subcarriers, and outputs the resultant. For example, in the example of FIG. 1, the data sequence is mapped to data symbols in the figure based on the scheduling information, the pilot sequence is mapped to predetermined pilot symbols in the figure, and the downlink control information is mapped to predetermined downlink control information symbols in the figure.

The frequency time transform section 204 performs frequency time transform processing, for example, Inverse Fast Fourier Transform (IFFT) on the modulation symbol sequence output from the mapping section 203 to transform into an OFDM signal on the time axis, and outputs the transformed signal to the GI inserting section 205. The GI inserting section 205 adds a guard interval GI to the OFDM signal generated in the frequency time transform section 204. The D/A conversion section 206 converts the signal with the guard interval GI added thereto into an analog signal. The radio transmission section 207 up-converts the analog signal, and transmits the signal to the communication terminal apparatus 300 from the antenna section 208.

Referring to FIG. 3, described next is the operation of the communication terminal apparatus 300. In the communication terminal apparatus 300, the radio reception section 302 receives a signal transmitted from the base station apparatus 200 via the antenna section 301. The A/D conversion section 303 converts the analog signal that is received and down-converted in the radio reception section 302 into a digital signal. The GI removing section 304 removes the guard interval GI from the digital signal, and outputs the signal without the guard interval GI to the time frequency transform section 305. The time frequency transform section 305 performs time frequency transform processing, for example, Fast Fourier Transform (FFT) on the OFDM signal output from the GI removing section 304, and thereby transforms the signal into a modulation symbol sequence.

The demapping section 306 first divides a pilot symbol from the modulation symbol sequence output from the time frequency transform section 305 to output to the reception quality measuring section 308. Next, the demapping section 306 demaps the downlink control information to output to the demodulation control section 314. Further, according to the scheduling information and modulation parameter information from the demodulation control section 314, the section 306 demaps the data sequence to output to the decoding section 307. In addition, propagation path compensation may be made to the modulation symbol sequence based on the pilot symbol.

The decoding section 307 performs error correcting decoding processing on the data sequence output from the demapping section 306 according to the scheduling information and modulation parameter information output from the demodulation control section 314, and outputs reception data. The demodulation control section 314 extracts the scheduling information (information concerning a resource block allocated to the transmission data to the communication terminal apparatus 300) and modulation parameter information (information concerning modulation parameters of each subcarrier in the allocated resource block) from the downlink control information input from the demapping section 306, and outputs the information to the demapping section 306 and decoding section 307. In addition, when the downlink control information is beforehand subjected to error correcting coding in the base station apparatus 200, error correcting decoding can be performed.

Referring to FIGS. 2 and 3, described next is a procedure by which the communication terminal apparatus 300 transmits report information to the base station apparatus 200 as feedback. The operation of the communication terminal apparatus 300 will be described first with reference to FIG. 3. The reception quality measuring section 308 measures reception quality on each subcarrier using the pilot symbol output from the demapping section 306, and outputs the reception quality measurement result to the reception quality information generating section 309. In addition, this Embodiment describes the case of measuring the reception quality using a pilot symbol, but the invention is naturally applicable to the case of performing reception quality measurement using a data symbol or performing reception quality measurement using an error correcting decoding decision result of reception data.

The reception quality information generating section 309 determines a request rank of each channel based on the reception quality measurement result in each subcarrier output from the reception quality measuring section 308, generates reception quality information indicating the reception quality measurement result for each subcarrier of each channel using the different number of levels (the number of quantization bits) corresponding to the determined request rank, and outputs the information. In addition, the reception quality information generating section 309 will specifically be described later.

The coding section 310 performs error correcting coding on the transmission data to the base station apparatus, and outputs a data sequence. The mapping section 311 maps the reception quality information generated in the reception quality information generating section 309 and the data sequence output from the coding section 310 to modulation symbols to output. In addition, the reception quality information may be notified to the base station apparatus separately from the transmission data to the base station apparatus.

The D/A conversion section 312 converts the signal output from the mapping section 311 into an analog signal. The radio transmission section 313 up-coverts the converted analog signal, and transmits the signal to the base station apparatus 200 from the antenna section 301.

The operation in the base station apparatus 200 will be described next with reference to FIG. 2. In the base station apparatus 200, the radio reception section 209 receives a signal transmitted from the communication terminal apparatus 300 via the antenna section 208. The radio reception section 209 down-converts the received analog signal, and the A/D conversion section 210 converts the analog signal into a digital signal to output to the demapping section 211. The demapping section 211 demaps the digital signal (modulation symbol) sent from the A/D conversion section 210 to divide into the reception quality information and data sequence, outputs the reception quality information to the reception quality information storing section 213, and further outputs the data sequence to the decoding section 212.

The decoding section 212 performs error correcting decoding on the data sequence extracted in the demapping section 211 to retrieve the reception data. The reception quality information storing section 213 stores the reception quality information notified from each communication terminal apparatus that is divided in the demapping section 211 for each communication terminal apparatus to output to the scheduling section 214.

Figure 4:
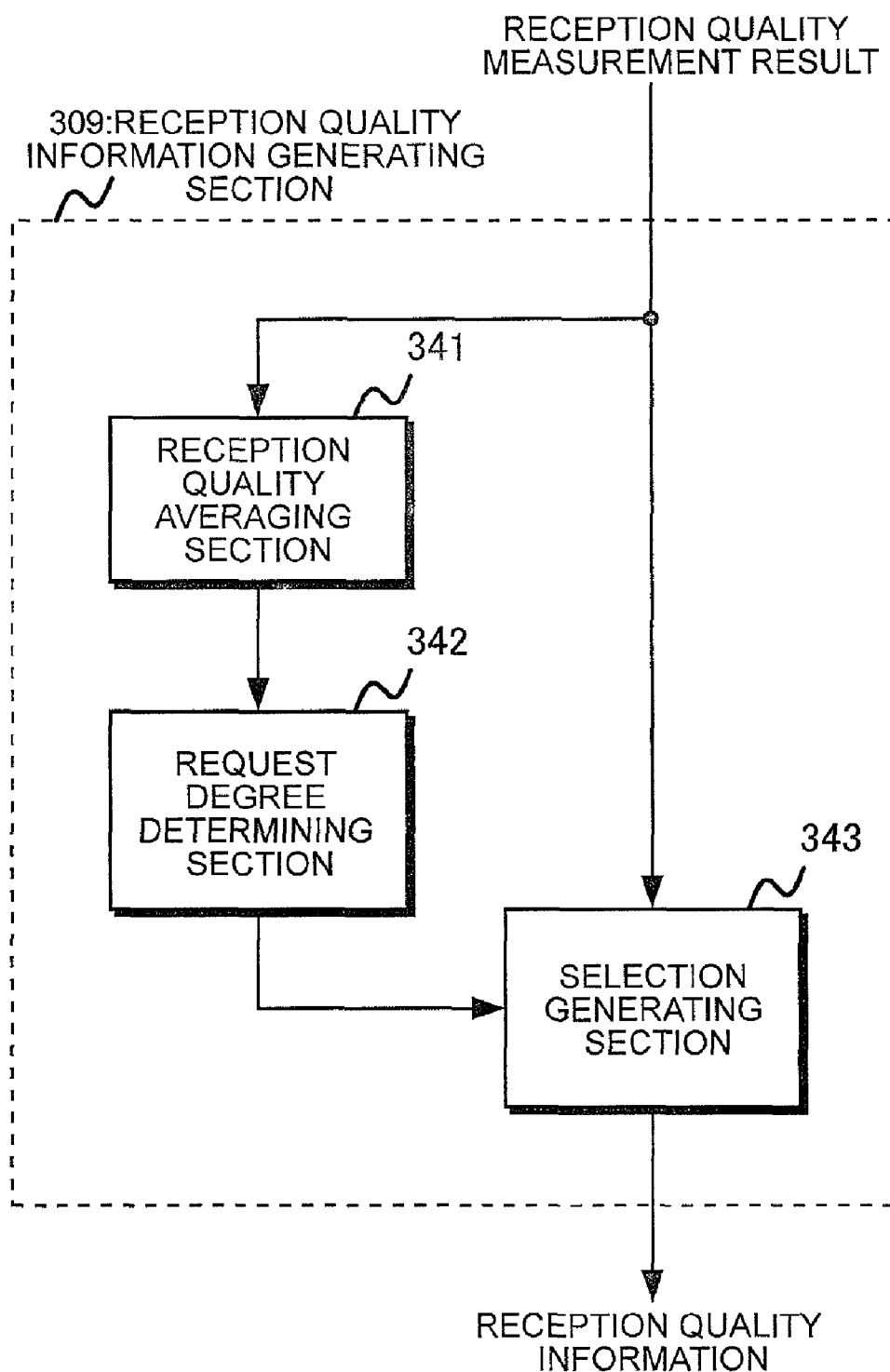
FIG. 4 is a block diagram showing a schematic configuration of a reception quality information generating section in the communication terminal apparatus.

FIG. 4 is a block diagram showing a schematic configuration of the reception quality information generating section 309 in the communication terminal apparatus 300. The reception quality measurement result of each subcarrier output from the reception quality measuring section 308 is output to a reception quality averaging section 341 and selection generating section 343. The reception quality averaging section 341 calculates an average value (reception quality average value of each channel) of reception quality measurement results on all the subcarriers belonging to each channel for each channel to output. A request degree determining section 342 ranks channels in descending order of the reception quality average value of each channel output from the reception quality averaging section 341 i.e. in the order in which allocation is requested to the base station apparatus, and outputs the rank of each channel.

The selection generating section 343 selects the number of stage levels i.e. number-of-bit information to quantize the reception quality measurement result of each subcarrier input from the reception quality measuring section 308, based on the rank of each channel determined in the request degree determining section 342, and generates the reception quality information for each subcarrier represented by the selected number of bits to output. Further, the section 343 adds information for identifying the kind of selected reception quality information on each channel to the reception quality information. In addition, the section 343 may add information concerning the allocation request degree of each channel.

Figure 5:
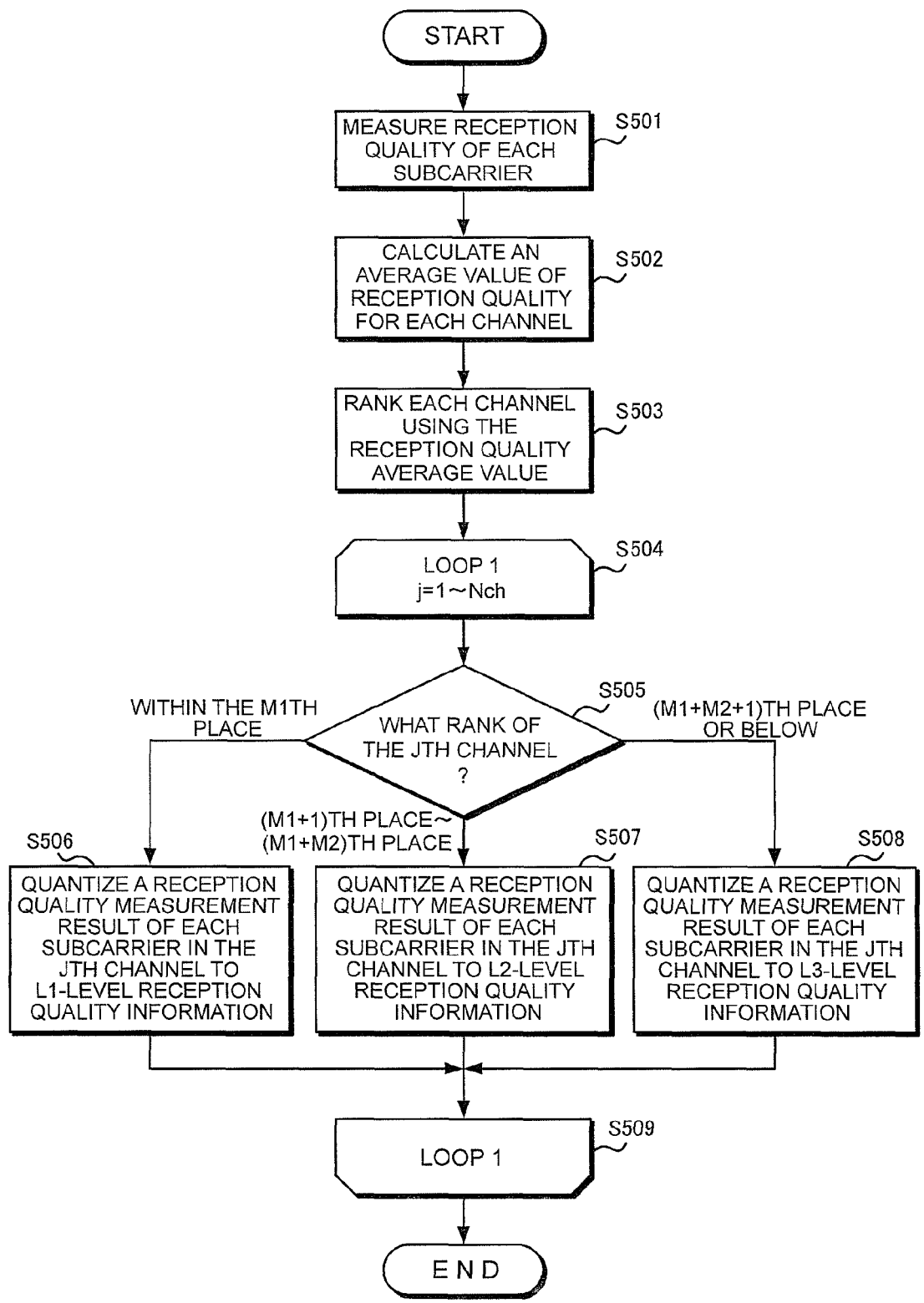
FIG. 5 is a flowchart showing an example of operation of reception quality information generation in the reception quality generating section (and a reception quality measuring section)

FIG. 5 is a flowchart showing an example of the operation of reception quality information generation in the reception quality information generating section 309 (and the reception quality measuring section 308). In FIG. 5, the number of all the channels is assumed to be N (Nch). Then, for M1 channels in descending order of reception quality among all the channels, the reception quality measurement result of each subcarrier is quantized by L1 levels (b1 bits) to generate the reception quality information (hereinafter, referred to as "L1 reception quality information"). Further, for next M2 channels, the reception quality measurement result of each subcarrier is quantized by L2 levels (b2 bits) to generate the reception quality information (hereinafter, referred to as "L2 reception quality information"). Furthermore, for remaining channels, the reception quality measurement result of each subcarrier is quantized by L3 levels (b3 bits) to generate the reception quality information (hereinafter, referred to as "L3 reception quality information").

In addition, herein, L1, L2, L3, b1, b2 and b3 are natural numbers meeting L1>L2>L3 and b1>b2>b3, and M1 and M2 are positive integers meeting (M1+M2)≦Nch.

The reception quality information generating operation will specifically be described below with reference to FIG. 5. First, using a pilot symbol output from the demapping section 306, the section 308 measures reception quality in each subcarrier to output (step S501). Next, the section 309 calculates an average value (reception quality average value of each channel) of reception quality measurement results on all the subcarriers belonging to each channel for each channel (step S502), and ranks each channel in descending order of the calculated reception quality average value of each channel (step S503). Then, the section 309 repeats the following processing on each channel (loop 1 of steps S504 to S509).

The section 309 compares the rank of the jth channel with the number M1 of channels to generate the L1 reception quality information and the number M2 of channels to generate the L2 reception quality information, and quantizes the reception quality measurement result of each subcarrier in the jth channel to the L1 reception quality information to output when the rank of the jth channel is within the M1th place (step S506), quantizes the reception quality measurement result of each subcarrier in the jth channel to the L2 reception quality information to output when the rank of the jth channel is in the range of the (M1+1) th place to the (M1+M2) th place (step S507), or quantizes the reception quality measurement result of each subcarrier in the jth channel to the L3 reception quality information to output when the rank of the jth channel is the (M1+M2+1)th place or below (step S508).

In the aforementioned example, as a substitute for information for identifying the kind of reception quality information selected on each channel added in the selection generation section 343, channel numbers may be added which respectively belong to a group of channels with the highest allocation request degree for notifying the L1 reception quality information, and to another group of channels with the second highest allocation request degree for notifying the L2 reception quality information.

Figure 6A:
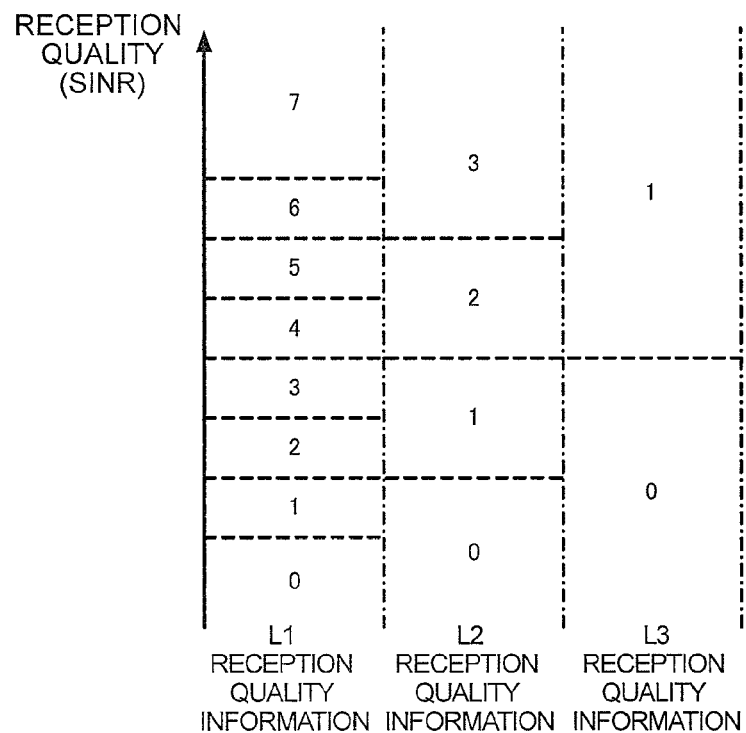
FIG. 6A is a diagram showing examples of L1 reception quality information, L2 reception quality information and L3 reception quality information in Embodiment 1.
Figure 6B:
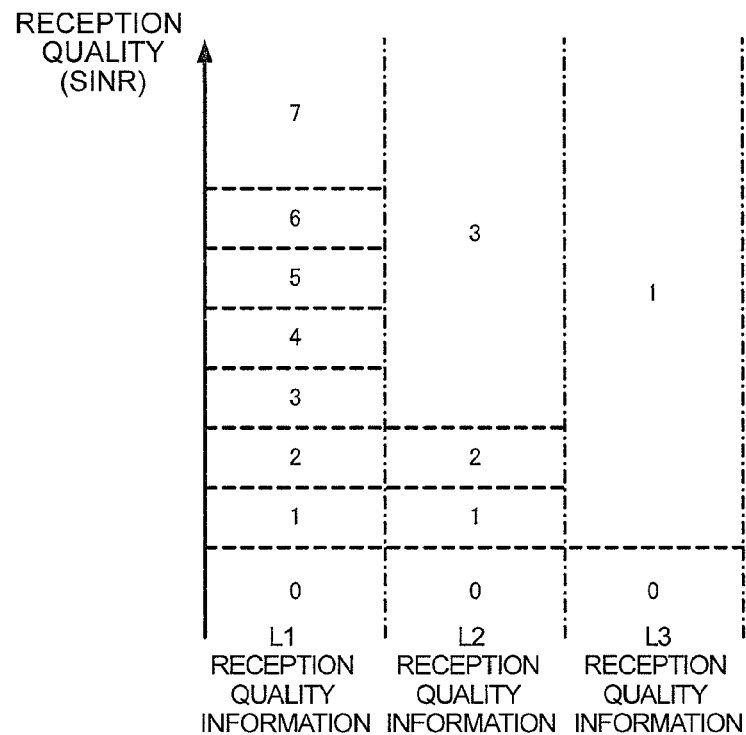
FIG. 6B is a diagram showing examples of L1 reception quality information, L2 reception quality information and L3 reception quality information in Embodiment 1.

FIGS. 6A, 6B, 7A and 7B are diagrams showing examples of the L1 reception quality information, L2 reception quality information and L3 reception quality information in this Embodiment. FIGS. 6A and 6B show examples of the correspondence between the reception quality (herein, SINR is used as the reception quality) and each level in the case of indicating the L1 reception quality information by 8 levels (L1=8, b1=3 bits) for a single subcarrier, the L2 reception quality information by 4 levels (L2=4, b2=2 bits) for a single subcarrier, and the L3 reception quality information by 2 levels (L3=2, b3=1 bit) for a single subcarrier.

For example, as shown in FIG. 6A, the settings may be made so that the L1 reception quality information is divided into finer levels by dividing one level of the L2 reception quality information by L1/L2 levels, and that the L2 reception quality information is divided into finer levels by dividing one level of the L3 reception quality information by L2/L3 levels. Meanwhile, as shown in FIG. 6B, the settings may be set that the reception quality represented by the lowest level is the same among three kinds of reception quality information, and that for the other levels, each level of the L2 reception quality information is made finer for the L1 reception quality information, while each level of the L3 reception quality information is made finer for the L2 reception quality information. However, the invention is not limited to these examples.

Further, the relationship between each level of the L1 reception quality information, L2 reception quality information and L3 reception quality information and the reception quality (SINR) is preferably determined based on a correspondence (SINR threshold or the like in selecting each modulation parameter) between the modulation parameter in adaptive modulation in the base station apparatus and the reception quality (SINR), determined further considering scheduling, or determined by dividing some range of the reception quality (SINR) into L1 equal parts, L2 equal parts or L3 equal parts, but the invention is not limited thereto.

Figure 7A:
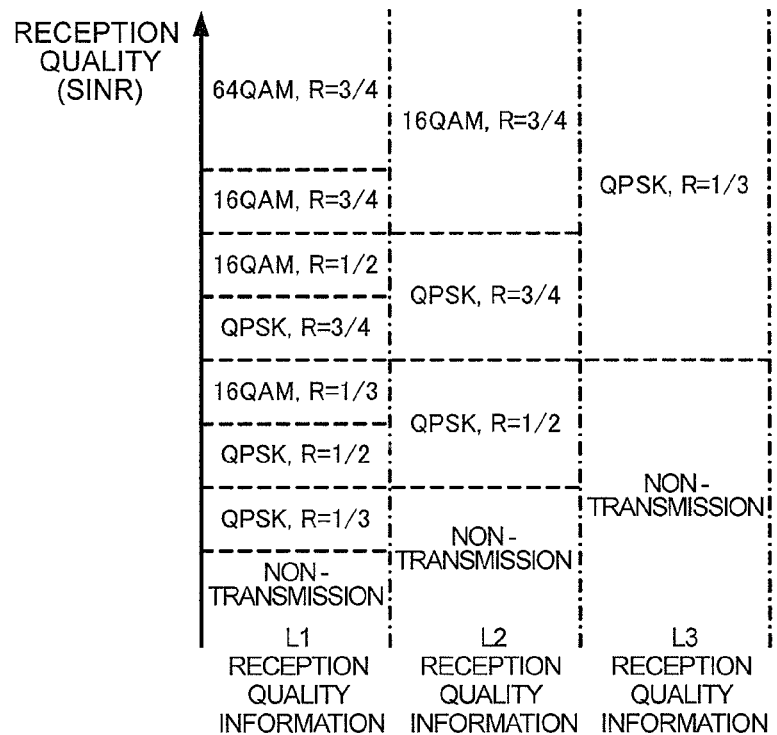
FIG. 7A is a diagram showing examples of L1 reception quality information, L2 reception quality information and L3 reception quality information in Embodiment 1.
Figure 7B:
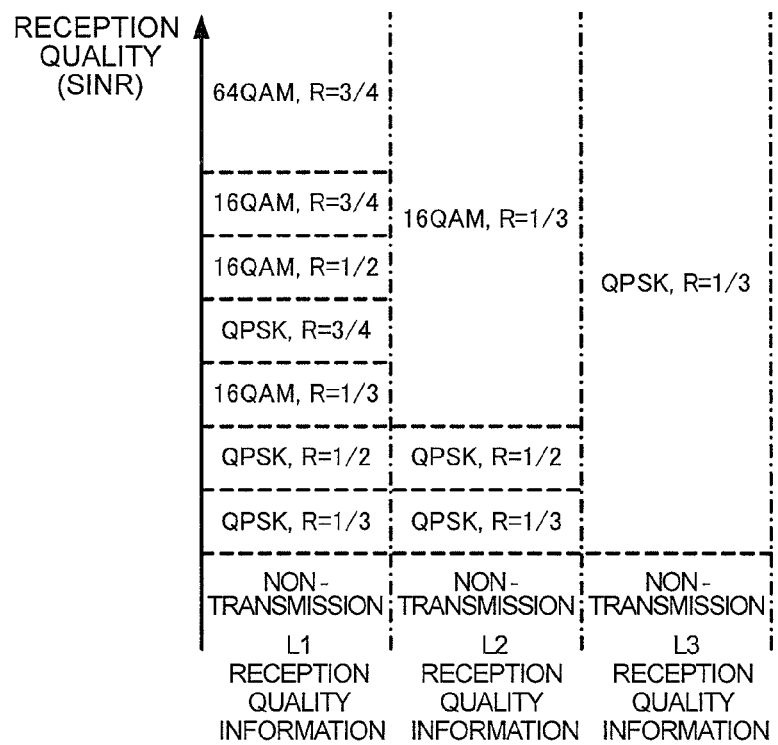
FIG. 7B a diagram showing examples of L1 reception quality information, L2 reception quality information and L3 reception quality information in Embodiment 1.

FIGS. 7A and 7B are diagrams showing examples of the correspondence between the reception quality (SINR) and each level of the L1 reception quality information, L2 reception quality information and L3 reception quality information when the communication terminal apparatus notifies the base station apparatus of MCS, as the reception quality information, which is a combination of a modulation scheme (three kinds, QPSK, 16QAM and 64QAM in the examples of FIGS. 7A and 7B) and a channel coding rate R (⅓, ½ and ¾ in the examples of FIGS. 7A and 7B). In addition, in the examples of FIGS. 7A and 7B, "non-transmission" (set as a carrier hole) is included as the lowest level of MCS.

FIGS. 7A and 7B show examples in the case of indicating the MCS by 8 levels (L1=8, b1=3 bits) for a single subcarrier as the L1 reception quality information, MCS by 4 levels (L2=4, b2=2 bits) for a single subcarrier as the L2 reception quality information, and MCS by 2 levels (L3=2, b3=1 bit) for a single subcarrier as the L3 reception quality information.

As shown in FIGS. 6A, 6B, 7A and 7B, the L1 reception quality information enables more detailed reception quality of each subcarrier to be notified, but provides the large information amount (the high number of bits) that the communication terminal apparatus notifies to the base station apparatus. In the L2 reception quality information, the reception quality of each subcarrier to notify is rougher than that of the L1 reception quality information, but the information amount is smaller. In the L3 reception quality information, the reception quality of each subcarrier to notify is further rougher than that of the L2 reception quality information, but the information amount can be made the smallest.

Figure 8:
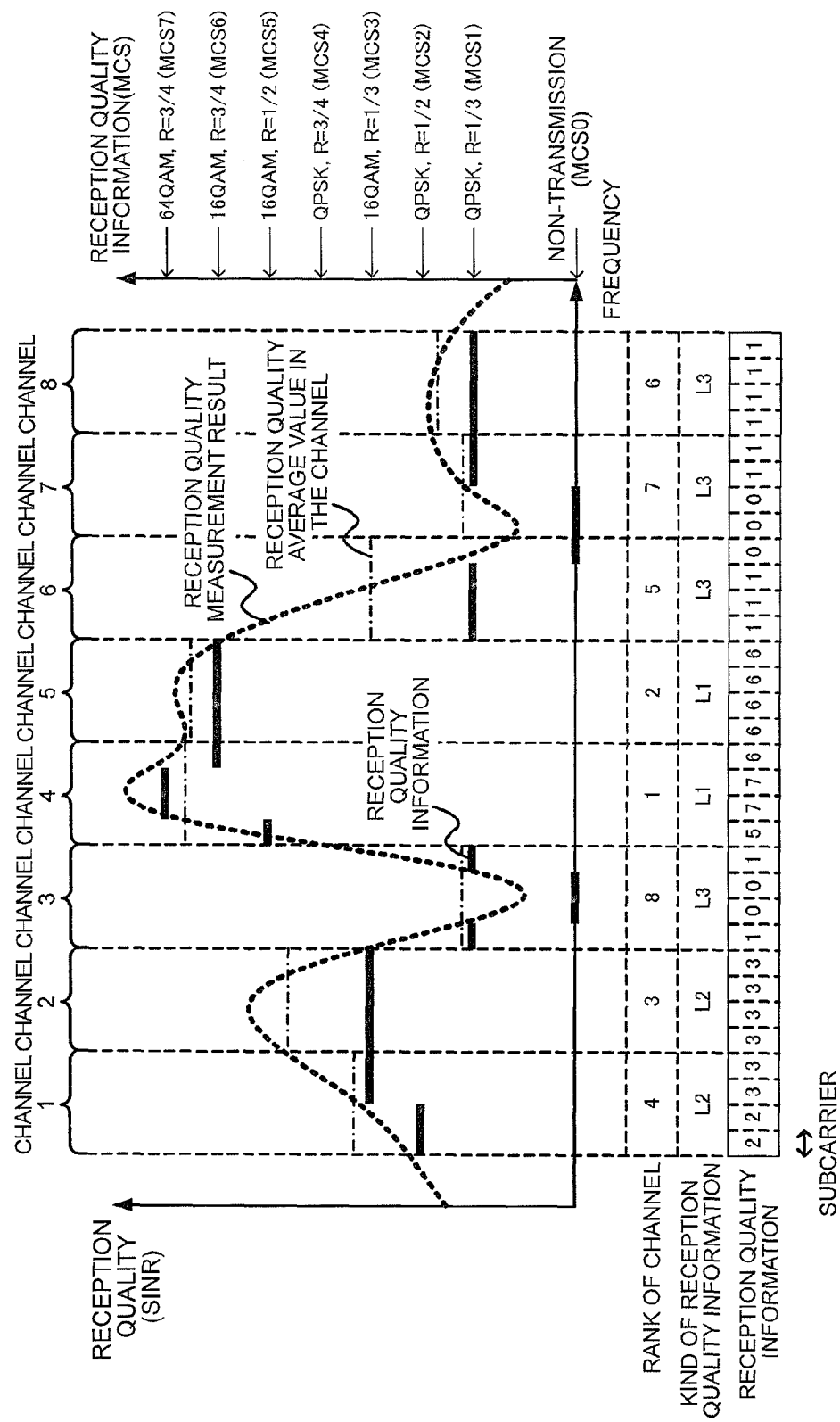
FIG. 8 is a diagram showing an example of generation results of reception quality information in Embodiment 1.

FIG. 8 is a diagram showing an example of generation results of reception quality information in this Embodiment. FIG. 8 shows an example in the case where used as the reception quality information is the L1 reception quality information, L2 reception quality information and L3 reception quality information shown in the example of FIG. 7B, the number of channels is "8" (Nch=8), the number of subcarriers contained in each channel is "4", the number of channels to report the L1 reception quality information is "2" (M1=2), the number of channels to report the L2 reception quality information is "2" (M2=2), and accordingly, the number of channels to report the L3 reception quality information is "4" (Nch−M1−M2=4).

The dotted lines in the graph of FIG. 8 show the SINR (vertical axis on the left side) that is the reception quality measurement result measured in the reception quality measuring section 308, the alternate long and short dashed lines show an average value of reception quality measurement results of all the subcarriers in each channel, and the solid lines show the actually generated reception quality information (vertical axis on the right side) of each subcarrier.

Each channel is ranked in descending order of the reception quality average value of each channel shown by the alternate long and short dashed lines in FIG. 8, the L1 reception quality information is generated for channels within the M1th place i.e. first-place channel 4 and second-place channel 5, the L2 reception quality information is generated for channels in the range from the (M+1)th place to the (M1+M2)th place i.e. third-place channel 2 and fourth-place channel 1, and the L3 reception quality information is generated for each of the other channels (channel 3, channel 6, channel 7 and channel 8) of the (M1+M2+1)th place or below.

In the example of FIG. 8, as the number of required bits, this Embodiment provides 56 bits, in contrast to 96 bits (8 channels×4 subcarriers in a channel×3 bits of reception quality information per subcarrier) that are required when the reception quality information of all the subcarriers is generated by the L1 reception quality information. Further, in contrast to the case of generating the reception quality information only for the predetermined number of channels with excellent reception quality, this Embodiment includes the reception quality information concerning all the subcarriers of all the channels.

Thus, according to this Embodiment, when the communication terminal apparatus 300 notifies the base station apparatus 200 of the reception quality information, for reception quality measurement results on subcarriers in each channel, the communication terminal apparatus 300 selects from notifying by the L1 reception quality information represented by L1 levels (b1 bits) for a single subcarrier, notifying by the L2 reception quality information represented by L2 levels (b2 bits, b2<b1) for a single subcarrier, and notifying by the L3 reception quality information represented by L3 levels (b3 bits, b3<b2) for a single subcarrier, corresponding to the priority (request degree) of the channel of which downlink allocation the communication terminal apparatus 300 requests to the base station apparatus 200.

Therefore, with respect to channels included in M1 channels with the highest reception quality or below in the downlink in the communication terminal apparatus 300 i.e. M1 channels with higher priorities for the communication terminal apparatus 300 to request their allocation to the base station apparatus 200, the communication terminal apparatus 300 notifies of the L1 reception quality information such that the reception quality of each subcarrier in the channel is indicated in detail using the high number of levels, the base station apparatus 200 is thereby able to perform efficient channel (resource block in the channel) allocation and adaptive modulation when the base station apparatus 200 allocates a channel from the M1 channels to the communication terminal apparatus 300, and it is possible to actualize transmission at higher speed.

Further, when the base station apparatus 200 cannot allocate anyone of the M1 channels with the highest reception quality in the downlink in the communication terminal apparatus 300 to the communication terminal apparatus 300 as a result of scheduling in the base station apparatus 200, for M2 channels with higher reception quality information after the M1 channels i.e. M2 channels with higher priorities to request their allocation after the M1 channels, the communication terminal apparatus 300 has notified of the L2 reception quality information indicating the reception quality of each subcarrier in the channel by intermediate detail degree using the lower number of levels than in the L1 reception quality information. Therefore, when the base station apparatus 200 allocates a channel from the M2 channels as a substitute for the M1 channels to the communication terminal apparatus 300, although efficiency of channel allocation and adaptive modulation is lower than in the L1 reception quality information, it is possible to reduce the information amount of reception quality information.

Meanwhile, when the base station apparatus 200 cannot allocate anyone of the M1 channels or the M2 channels providing the high reception quality in the downlink in the communication terminal apparatus 300 to the communication terminal apparatus 300 as a result of scheduling in the base station apparatus 200, for the other channels, the communication terminal apparatus 300 has notified of the L3 reception quality information roughly indicating the reception quality of each subcarrier in the channel using the lower number of levels than in the L2 reception quality information. Therefore, also when the base station apparatus 200 allocates a channel from channels except the M1 channels and M2 channels to the communication terminal apparatus 300, it is possible to ensure transmission by rough adaptive modulation, while reducing the information amount of reception quality information to the lowest.

From the foregoing, while suppressing the notified information amount of reception quality information in the uplink from the communication terminal apparatus, when a channel with a high allocation request degree in the communication terminal apparatus is allocated in data communications in the downlink, it is possible to perform high-speed communications by efficient scheduling and adaptive modulation based on detailed reception quality information from the communication terminal apparatus. Further, even when the base station apparatus has to allocate a channel with a low allocation request degree in the communication terminal apparatus, the base station apparatus is capable of applying scheduling and adaptive modulation based on rough reception quality information in the communication terminal apparatus.

Embodiment 2

Embodiment 2 of the invention will be described next. Embodiment 1 describes the case where corresponding to the channel allocation request degree in the communication terminal apparatus 300, as the reception quality information of subcarriers in each channel, the communication terminal apparatus 300 selects from among the L1 reception quality information indicating the reception quality of each subcarrier by L1 levels represented by b1 bits per subcarrier, the L2 reception quality information indicating the reception quality of each subcarrier by L2 levels represented by b2 bits (b2<b1) per subcarrier, and the L3 reception quality information indicating the reception quality of each subcarrier by L3 levels represented by b3 bits (b3<b2) per subcarrier.

A communication terminal apparatus 1000 in this Embodiment selects information indicative of a reception quality measurement result (hereinafter, referred to as "non-difference reception quality information", or "non-difference information") for the first subcarrier of the first channel as the reception quality information. Further, for the other subcarriers, corresponding to the allocation request degree of a channel to which the subcarrier belongs, the section 1000 selects from among reception quality information (hereinafter, referred to as "D1 difference reception quality information") indicating a difference value from an adjacent subcarrier in information indicative of a reception quality measurement result by difference levels of D1 levels (b1' bits: b1' is a natural number), reception quality information (hereinafter, referred to as "D2 difference reception quality information") indicating such a difference value by difference levels of D2 levels (b2' bits: natural number meeting b2'<b1'), and reception quality information (hereinafter, referred to as "D3 difference reception quality information") indicating such a difference value by difference levels of D3 levels (b3' bits: natural number meeting b3'<b2').

FIGS. 9A, 9B and 9C show correspondence examples between the reception quality information and the difference value when D1=8 (b1'=3), D2=4 (b2'=2) and D3=2 (b3'=1). In the example of FIG. 9A, the case is shown where eight values of from "0" to "7" represented by three bits are defined as the D1 difference reception quality information, and are relatively associated with difference values of 0, +1, +2, +3, −4, −3, −2, and −1, four values of from "0" to "3" represented by two bits are defined as the D2 difference reception quality information, and are relatively associated with difference values of ±0, +1, −2, and −1, and two values of "0" and "1" represented by one bit are defined as the D3 difference reception quality information, and are relatively associated with difference values of +1 and −1. FIGS. 9B and 9C show the other examples where a value of each of the reception quality information is similarly associated with a respective difference value.

Thus, as the difference values represented by the D1 levels (b1' bits), D2 levels (b2' bits) and D3 levels (b3' bits), it is preferable to use values represented by two"s-complement numbers of the respective number of bits, or set values such that ranges of the represented difference value are almost the same, but the invention is not limited thereto.

Figure 10:
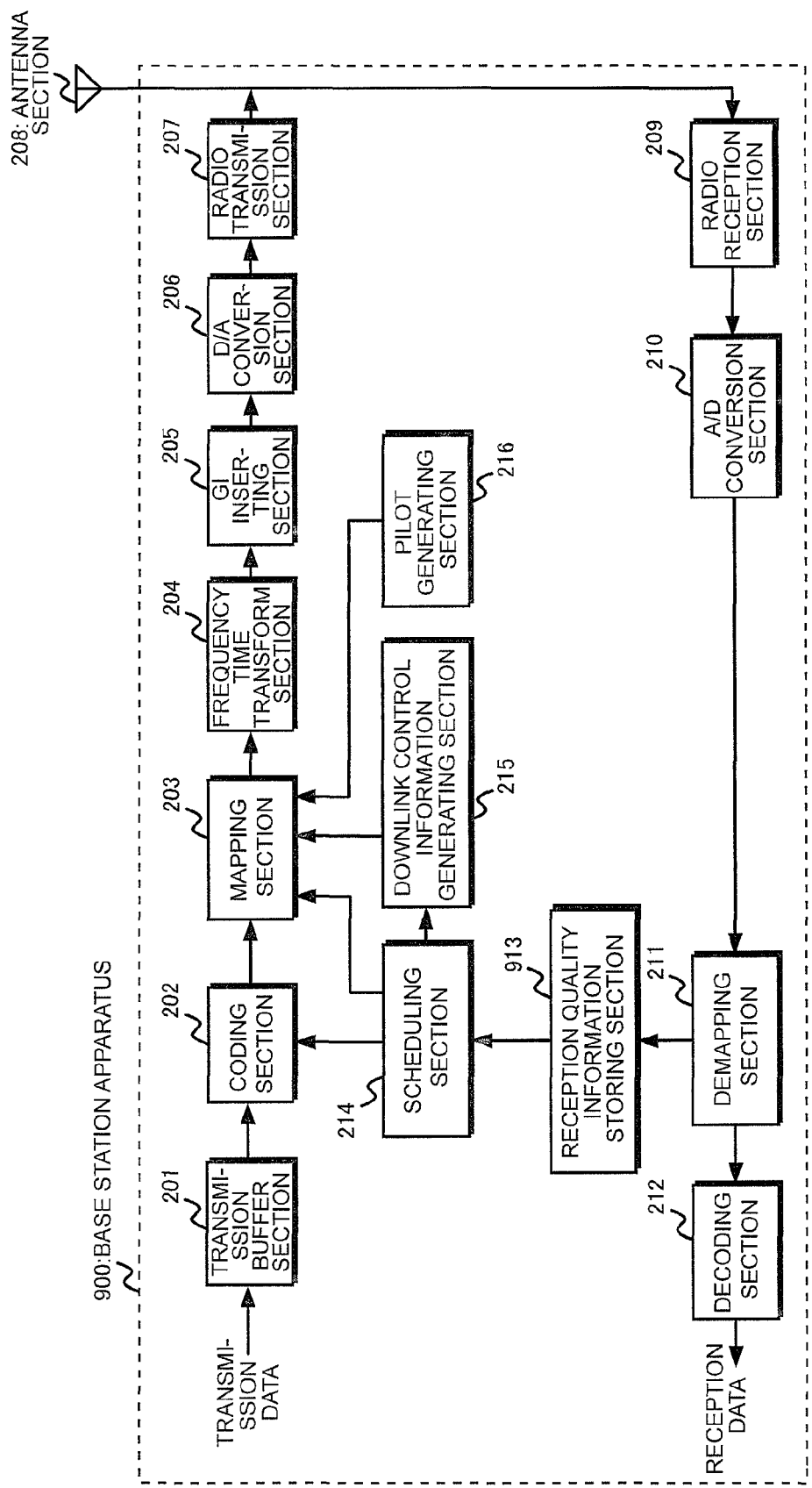
FIG. 10 is a block diagram showing a schematic configuration of a base station apparatus in Embodiment 2.
Figure 11:
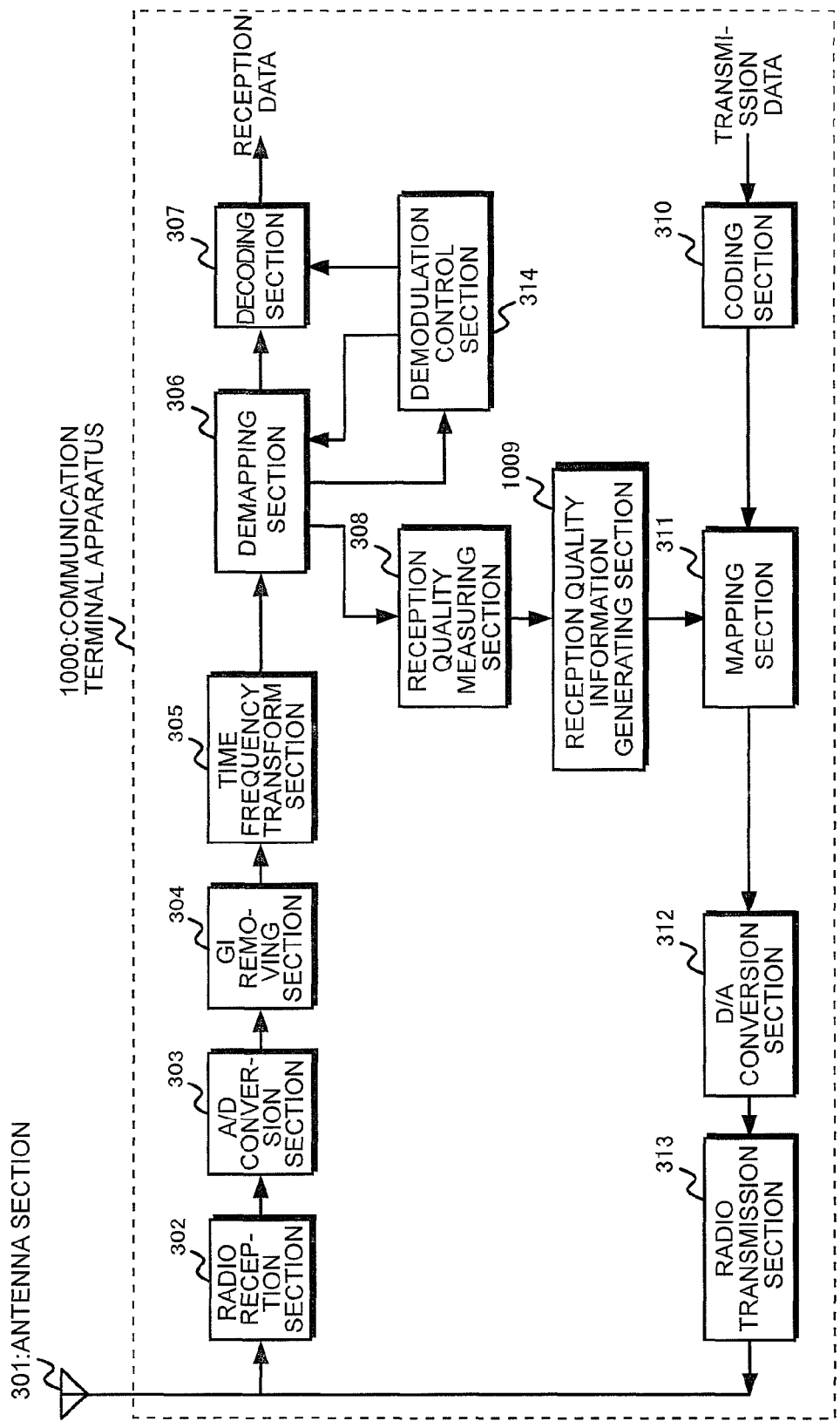
FIG. 11 is a block diagram showing a schematic configuration of a communication terminal apparatus in Embodiment 2.

FIGS. 10 and 11 are block diagrams respectively showing schematic configurations of the base station apparatus 900 and communication terminal apparatus 1000 in this Embodiment. Among functional blocks of the base station apparatus 900 in this Embodiment, a reception quality information storing section 913 corresponding to the reception quality information storing section 213 of the base station apparatus 200 differs from Embodiment 1. Further, in the communication terminal apparatus 1000 in this Embodiment, a reception quality information generating section 1009 corresponding to the reception quality information generating section 309 of the communication terminal apparatus 300 differs from Embodiment 1. The other configurations of the base station apparatus and communication terminal apparatus are the same as in Embodiment 1 (FIGS. 2 and 3), and descriptions thereof are omitted.

In the base station apparatus 900 as shown in FIG. 10, the reception quality information storing section 913 adds sequentially a difference value associated with the difference reception quality information concerning each subcarrier using the non-difference reception quality information concerning the first subcarrier of the first channel as a starting point, based on the reception quality information notified from each communication terminal apparatus that is divided in the demapping section 211, thereby restores the information indicative of the reception quality of each subcarrier to store for each communication terminal apparatus, and outputs the resultant to the scheduling section 214.

In the communication terminal apparatus 1000 as shown in FIG. 11, the reception quality information generating section 1009 determines a request rank of each channel based on a reception quality measurement result in each subcarrier output from the reception quality measuring section 308, calculates each difference value from an adjacent subcarrier in the reception quality measurement result for the other subcarriers using the reception quality measurement result of the first subcarrier of the first channel as a starting point, and using the different number of levels (the number of bits of the difference value) corresponding to the determined request degree, generates the difference reception quality information indicative of the difference value to output.

Figure 12:
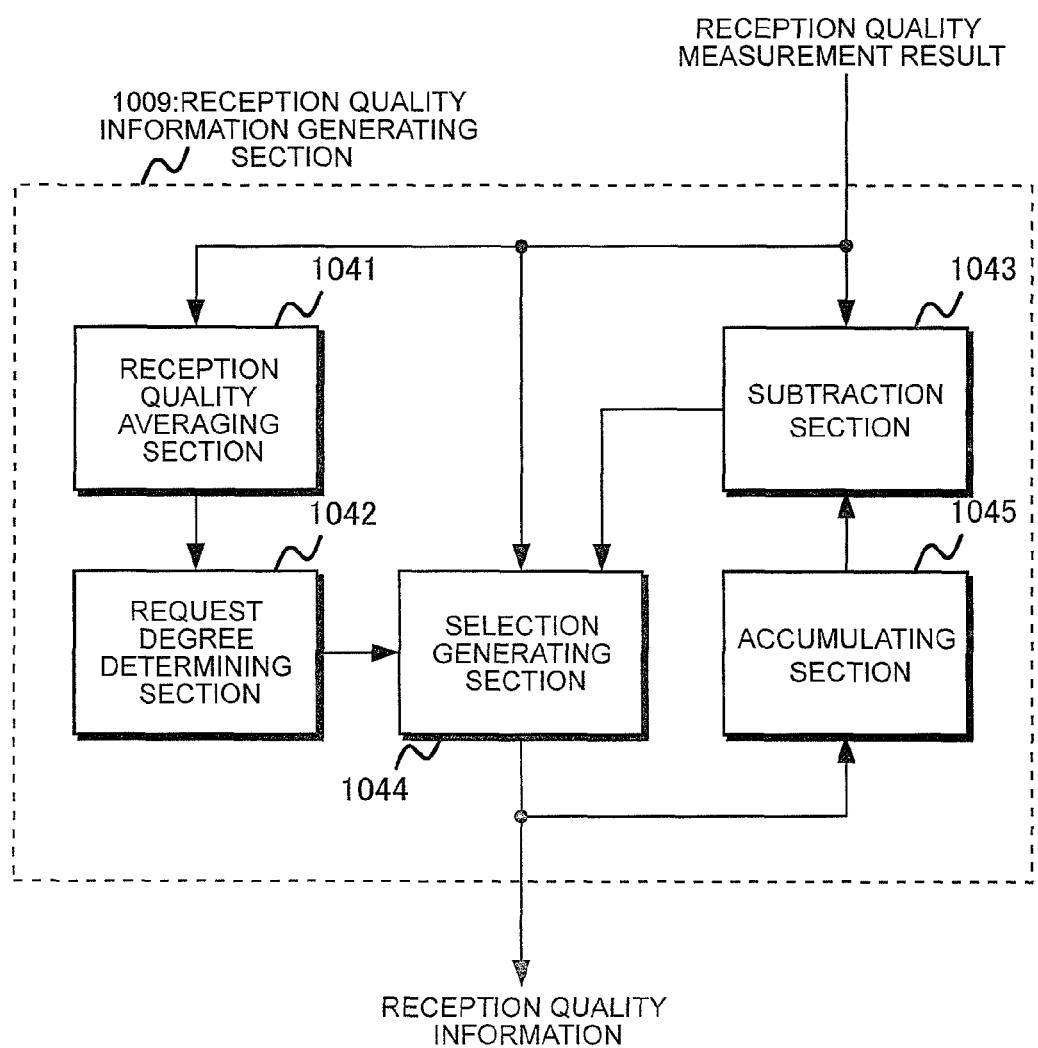
FIG. 12 is a block diagram showing a schematic configuration of a reception quality information generating section in the communication terminal apparatus.

FIG. 12 is a block diagram showing a schematic configuration of the reception quality information generating section 1009 in the communication terminal apparatus 1000. A reception quality measurement result of each subcarrier output from the reception quality measuring section 308 is input to a reception quality averaging section 1041, subtraction section 1043 and selection generating section 1044. The reception quality averaging section 1041 calculates an average value (reception quality average value of each channel) of reception quality measurement results of all the subcarriers belonging to each channel for each channel to output. A request degree determining section 1042 ranks each channel in descending order of the reception quality average value of each channel output from the reception quality averaging section 1041 i.e. in the order in which allocation is requested to the base station apparatus, and outputs the rank of each channel. The subtraction section 1043 calculates a difference value by subtracting a cumulative value output from an accumulating section 1045 from the reception quality measurement result of each subcarrier, and outputs the difference value.

With respect to the first subcarrier, the selection generating section 1044 quantizes a reception quality measurement result output from the reception quality measuring section 308 by L0 levels (b0 bits: b0 is a natural number) enabling the most detailed expression, and outputs as the non-difference reception quality information. With respect to the other subcarriers, for the difference values input from the subtraction section 1043, the section 1044 selects which difference reception quality information to use and represent from among the D1 difference reception quality information, D2 difference reception quality information and D3 difference reception quality information based on the rank of each channel determined in the request degree determining section 1042, and generates the reception quality information for each subcarrier expressed by the selected difference reception quality information to output. Further, the section 1044 adds information for identifying the kind of difference reception quality information selected in each channel to the reception quality information. Alternately, the section 1044 may add information concerning the allocation request degree of each channel. Furthermore, the section 1044 may add numbers of channels belonging to a group with the highest allocation request degree to notify the D1 difference reception quality information, and another group to notify the D2 difference reception quality information with the second highest allocation degree. When the accumulating section 1045 receives the reception quality information generated in the selection generating section 1044, and receives the non-difference reception quality information concerning the first subcarrier, the accumulating section 1045 sets a cumulative value at a value indicated by the reception quality information, while when receiving the difference reception quality information concerning the other subcarriers, adds the difference value indicated by the difference reception quality information to the cumulative value and outputs the cumulative value.

Figure 13A:
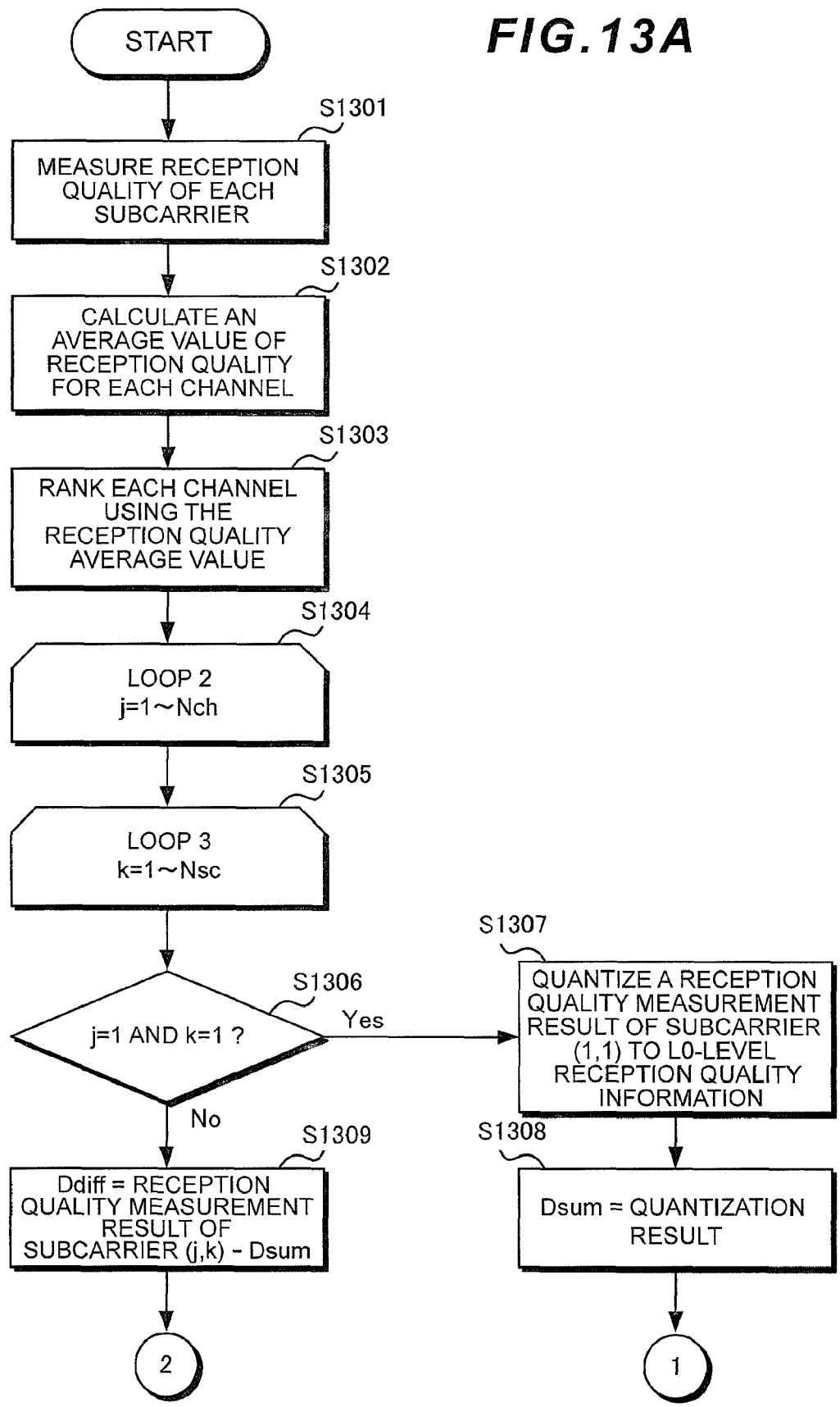
FIG. 13A is a flowchart showing an example of operation of reception quality information generation in the reception quality generating section (and a reception quality measuring section)
Figure 13B:
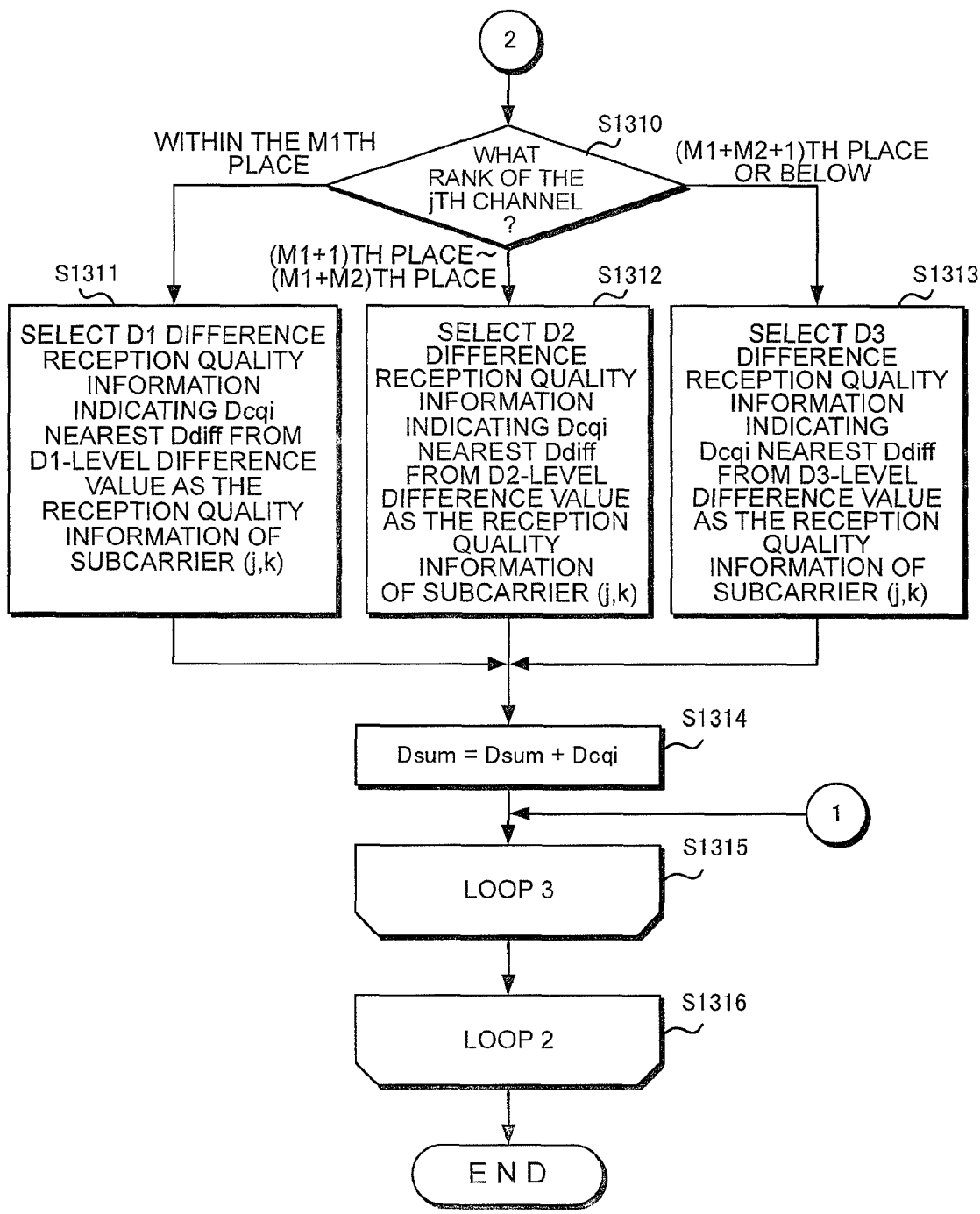
FIG. 13B is another flowchart showing the example of operation of reception quality information generation in the reception quality generating section (and the reception quality measuring section)

FIGS. 13A and 13B are flowcharts showing an example of operation of reception quality information generation in the reception quality information generating section 1009 (and the reception quality measuring section 308). FIGS. 13A and 13B show the example in the case where the number of all the channels is Nch, the number of subcarriers included in each subcarrier is Nsc, the D1 difference reception quality information is generated from a difference value obtained by subtracting a cumulative value output from the accumulating section 1045 from the reception quality measurement result of each subcarrier for M1 channels in descending order of reception quality among all the channels, the D2 difference reception quality information is generated from the difference value in each subcarrier for next M2 channels, and the D3 reception quality information is generated from the difference value in each subcarrier for the remaining channels. In addition, herein, M1 and M2 are positive integers meeting (M1+M2)≦Nch.

The reception quality information generating operation will specifically be described below with reference to FIGS. 13A and 13B. First, using a pilot symbol output from the demapping section 306, the section 308 measures the reception quality on each subcarrier to output (step S1301). Next, the section 1009 calculates an average value (reception quality average value of each channel) of reception quality measurement results of all the subcarriers belonging to each channel for each channel (step S1302), and ranks each channel in descending order of the calculated reception quality average value of each channel (step S1303). Then, the section 1009 repeats the following processing (loop 2 of steps S1304 to S1316) on each channel, and further, on the channel, repeats the following processing (loop 3 of steps S1305 to S1315) on each subcarrier.

In the case of the first subcarrier of the first channel (Yes in step S1306), the section 1009 quantizes a reception quality measurement result on the first subcarrier to be the L0-level reception quality information to output (step S1307), and sets the quantization result on the cumulative value Dsum (step S1308).

In the case of the other subcarriers (j, k)≠(1, 1) (No in step S1306), the section 1009 calculates a difference value Ddiff by subtracting the cumulative value Dsum from a reception quality measurement result of a subcarrier (j, k) (step S1309), and compares the rank of the jth channel with the number M1 of channels to generate the D1 difference reception quality information and the number M2 of channels to generate the D2 difference reception quality information (step S1310).

When the rank of the jth channel is within the M1th place in step S1310, the section 1009 selects difference reception quality information indicative of a value Dcqi nearest the difference value Ddiff on the subcarrier (j, k) from the D1 difference reception quality information to output (step S1311). Meanwhile, when the rank of the jth channel is in the range of the (M1+1) th place to the (M1+M2)th place, the section 1009 selects difference reception quality information indicative of a value Dcqi nearest the difference value Ddiff on the subcarrier (j, k) from the D2 difference reception quality information to output (step S1312). When the rank of the jth channel is the (M1+M2+1)th place or below, the section 1009 selects difference reception quality information indicative of a value Dcqi nearest the difference value Ddiff on the subcarrier (j, k) from the D3 difference reception quality information to output (step S1313). The value Dcqi indicated by the selected difference reception quality information is added to the cumulative value Dsum (step S1314).

Figure 14:
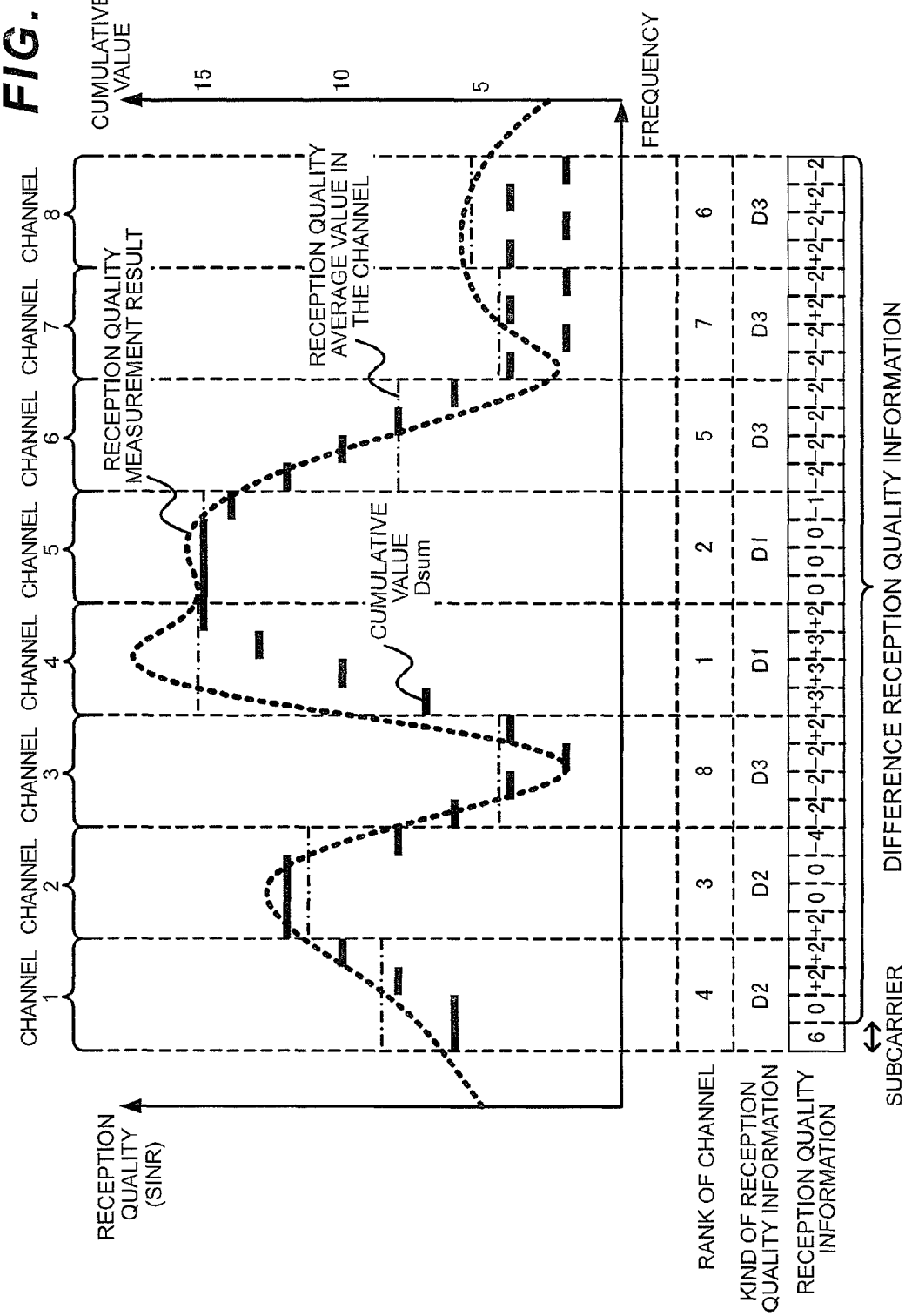
FIG. 14 is a diagram showing an example of generation results of reception quality information in Embodiment 2.

FIG. 14 is a diagram showing an example of generation results of reception quality information in this Embodiment. FIG. 14 shows an example in the case where used as the reception quality information is the D1 difference reception quality information, D2 difference reception quality information and D3 difference reception quality information shown in the example of FIG. 9B, the number of channels is "8" (Nch=8), the number of subcarriers contained in each channel is "4", the number of channels to report the D1 difference reception quality is "2" (M1=2), the number of channels to report the D2 difference reception quality is "2" (M2=2), and accordingly, the number of channels to report the D3 difference reception quality is "4" (Nch−M1−M2=4).

The dotted lines in the graph of FIG. 14 show the SINR (vertical axis on the left side) that is the reception quality measurement result measured in the reception quality measuring section 308, and the alternate long and short dashed lines show an average value of reception quality measurement results of all the subcarriers in each channel. Further, the solid lines show the actually generated cumulative value (vertical axis on the right side) on each subcarrier.

Each channel is ranked in descending order of the reception quality average value of each channel shown by the alternate long and short dashed lines, and the reception quality measurement result on the first subcarrier is quantized to the L0-level (b0-bit) reception quality information and output (in the example of FIG. 14, L0=16, b0=4, the reception quality information is "6"). For the other subcarriers, the D1 difference reception quality information is generated for channels to which the subcarriers belong within the M1th place i.e. first-place channel 4 and second-place channel 5, the D2 difference reception quality information is generated for channels in the range from the (M+1)th place to the (M1+M2)th place i.e. third-place channel 4 and fourth-place channel 1, and the D3 difference reception quality information is generated for each of the other channels (channel 3, channel 6, channel 7 and channel 8) of the (M1+M2+1)th place or below.

In the example of FIG. 14, as the number of required bits, this Embodiment provides 58 bits, in contrast to 128 bits (8 channels×4 subcarriers in a channel×4 bits of reception quality information per subcarrier) that are required when the reception quality information of all the subcarriers is generated by the L0-level reception quality information. Further, in contrast to the case of generating the reception quality information only for the predetermined number of channels with excellent reception quality, this Embodiment includes the reception quality information concerning all the subcarriers of all the channels.

Thus, according to this Embodiment, when the communication terminal apparatus 1000 notifies the base station apparatus 900 of the reception quality information, corresponding to the priority (request degree) of the channel of which downlink allocation the communication terminal apparatus 1000 requests to the base station apparatus 900, the communication terminal apparatus 1000 notifies the information indicative of the reception quality measurement result of the first subcarrier of the first channel, and for the other subcarriers, selects from notifying by the D1 difference reception quality information representing a difference value from the adjacent subcarrier in the information indicating the reception quality by D1 levels, notifying by the D2 difference reception quality information representing the difference value by D2 levels, and notifying by the D3 difference reception quality information representing the difference value by D3 levels.

Thus, with respect to channels included in M1 channels with the highest reception quality or below in the downlink in the communication terminal apparatus 1000 i.e. M1 channels with higher priorities for the communication terminal apparatus 1000 to request their allocation to the base station apparatus 900, the communication terminal apparatus 1000 notifies of the D1 difference reception quality information specifically indicating the difference value from the adjacent subcarrier in the information indicating the reception quality of each subcarrier in the channel using the high number of levels. By this means, when the base station apparatus 900 allocates a channel from the M1 channels to the communication terminal apparatus 1000, the base station apparatus 900 is able to perform efficient channel (resource block in the channel) allocation and adaptive modulation, and it is possible to actualize transmission at higher speed.

Further, when the base station apparatus 900 cannot allocate any one of the M1 channels with the highest reception quality in the downlink in the communication terminal apparatus 1000 to the communication terminal apparatus 1000 as a result of scheduling in the base station apparatus 900, for M2 channels with higher reception quality information after the M1 channels i.e. M2 channels with higher priorities to request their allocation after the M1 channels, the communication terminal apparatus 1000 has notified of the D2 difference reception quality information indicating the difference value from the adjacent subcarrier in the information indicating the reception quality of each subcarrier in the channel by intermediate detail degree using the lower number of levels than in the D1 difference reception quality information. Therefore, when the base station apparatus 900 allocates a channel from the M2 channels as a substitute for the M1 channels to the communication terminal apparatus 1000, although efficiency of channel allocation and adaptive modulation is lower than in the D1 difference reception quality information, it is possible to reduce the information amount of reception quality information.

Meanwhile, when the base station apparatus 900 cannot allocate any one of the M1 channels or the M2 channels providing the high reception quality in the downlink in the communication terminal apparatus 1000 to the communication terminal apparatus 1000 as a result of scheduling in the base station apparatus 900, for the other channels, the communication terminal apparatus 1000 has notified of the D3 difference reception quality information roughly indicating the difference value from the adjacent subcarrier in the information indicating the reception quality of each subcarrier in the each channel using the lower number of levels than in the D2 difference reception quality information. Therefore, also when the base station apparatus 900 allocates a channel from channels except the M1 channels and M2 channels to the communication terminal apparatus 1000, it is possible to ensure transmission by rough adaptive modulation, while reducing the information amount of reception quality information to the lowest.

As described above, according to this Embodiment, while suppressing the notified information amount of reception quality information in the uplink from the communication terminal apparatus, when a channel with a high allocation request degree in the communication terminal apparatus is allocated in data communications in the downlink, it is possible to perform high-speed communications by efficient scheduling and adaptive modulation based on detailed reception quality information from the communication terminal apparatus. Meanwhile, even when the base station apparatus has to allocate a channel with a low allocation request degree in the communication terminal apparatus, the base station apparatus is capable of applying scheduling and adaptive modulation based on rough reception quality information in the communication terminal apparatus.

Embodiment 3

Figure 15:
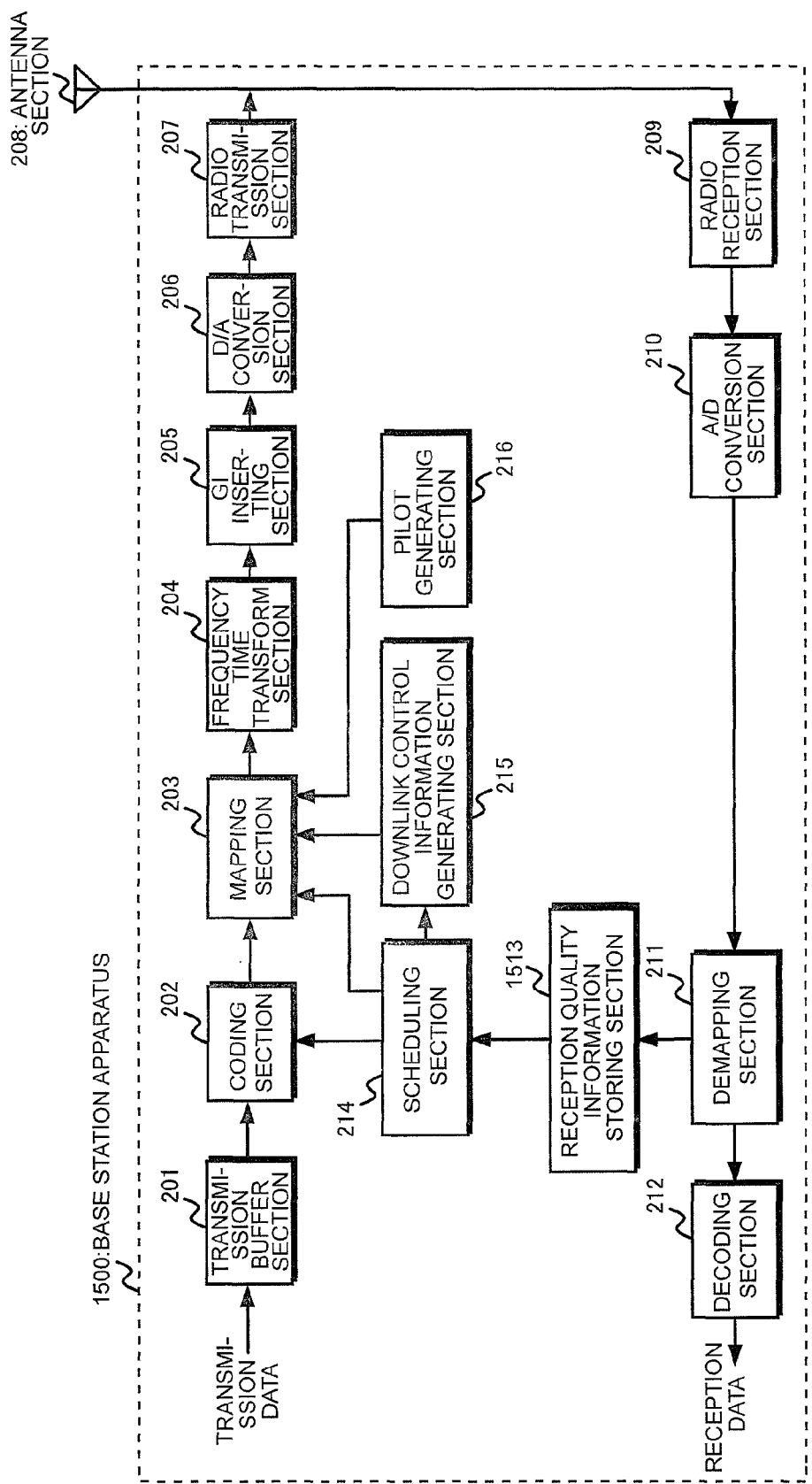
FIG. 15 is a block diagram showing a schematic configuration of a base station apparatus in Embodiment 3.
Figure 16:
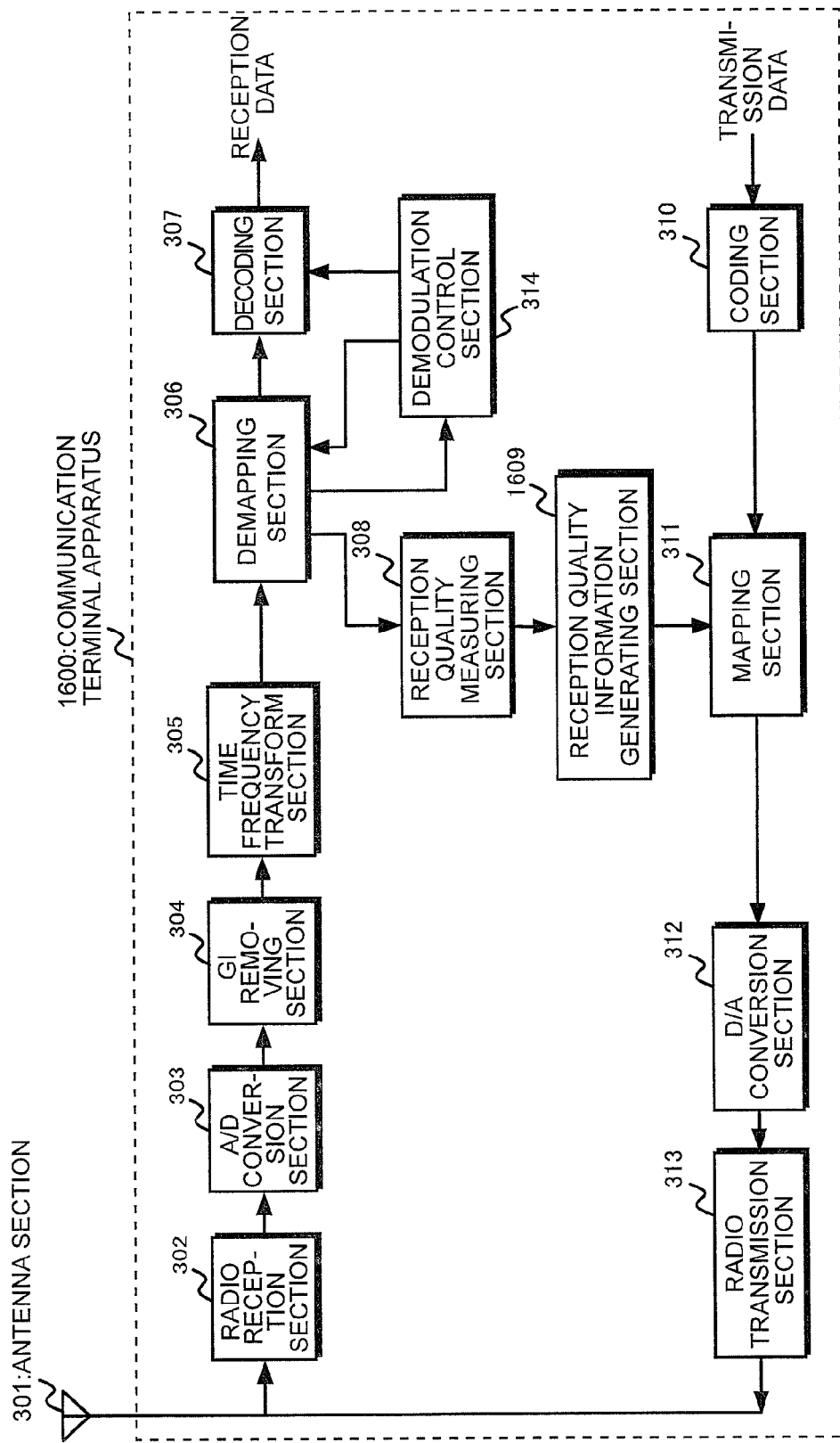
FIG. 16 is a block diagram showing a schematic configuration of a communication terminal apparatus in Embodiment 3.

Embodiment 3 of the invention will be described next. FIGS. 15 and 16 are block diagrams respectively showing schematic configurations of a base station apparatus 1500 and communication terminal apparatus 1600 in this Embodiment. Embodiment 1 describes the case where corresponding to the channel allocation request degree in the communication terminal apparatus 300, as the reception quality information of subcarriers in each channel, the communication terminal apparatus 300 selects from among the L1 reception quality information indicating the reception quality of each subcarrier by L1 levels represented by b1 bits per subcarrier, the L2 reception quality information indicating the reception quality of each subcarrier by L2 levels represented by b2 bits (b2<b1) per subcarrier, and the L3 reception quality information indicating the reception quality of each subcarrier by L3 levels represented by b3 bits (b3<b2) per subcarrier. Further, Embodiment 2 describes the case where corresponding to the channel allocation request degree in the communication terminal apparatus 1000, as the reception quality information of subcarriers in each channel, the communication terminal apparatus 1000 selects information indicative of a reception quality measurement result concerning the first subcarrier of the first channel, and for the other subcarriers, selects from among the D1 difference reception quality information indicating a difference value from an adjacent subcarrier in the information indicative of reception quality by D1 levels represented by b1' bits, the D2 difference reception quality information indicating the difference value by D2 levels represented by b2' bits, and the D3 difference reception quality information indicating the difference value by D3 levels represented by b3' bits.

The communication terminal apparatus 1600 in this Embodiment selects, as the reception quality information on subcarriers in each channel, combines the non-difference reception quality information indicative of a reception quality measurement result and difference reception quality information indicative of a difference value from an adjacent subcarrier in the information indicative of reception quality with a difference frequency corresponding to the allocation request degree of each channel to select. Among functional blocks in the base station apparatus 1500 in this Embodiment, a reception quality information storing section 1513 corresponding to the reception quality information storing section 913 of the base station apparatus 900 differs from Embodiment 2. Further, in the communication terminal apparatus 1600 in this Embodiment, a reception quality information generating section 1609 corresponding to the reception quality information generating section 1009 of the communication terminal apparatus 1000 differs from Embodiment 2. The other configurations of the base station apparatus and communication terminal apparatus are the same as in Embodiment 2 (FIGS. 10 and 11), and descriptions thereof are omitted.

In the base station apparatus 1500 as shown in FIG. 15, the reception quality information storing section 1513 adds sequentially a difference value associated with the difference reception quality information of each subcarrier such that the difference reception quality information is notified, using the non-difference reception quality information of each subcarrier such that the non-difference reception quality information is notified as a starting point, based on the reception quality information notified from each communication terminal apparatus that is divided in the demapping section 211, thereby restores the information indicative of the reception quality of each subcarrier to store for each communication terminal apparatus, and outputs the resultant to the scheduling section 214.

Further, in the communication terminal apparatus 1600 as shown in FIG. 16, the reception quality information generating section 1609 determines the request rank of each channel based on a reception quality measurement result in each subcarrier output from the reception quality measuring section 308, selects a subcarrier to notify the non-difference reception quality information corresponding to the request rank of each channel, and generates the information indicative of a reception quality measurement result as the non-difference reception quality information for the subcarrier to notify the non-difference reception quality information. For subcarriers except the aforementioned subcarrier, the section 1609 calculates a difference value from an adjacent subcarrier in a reception quality measurement result of the subcarrier sequentially using the non-difference reception quality information as a starting point, and generates the difference reception quality information indicating the difference value using the lower number of levels (the number of bits of the difference value) than that in the non-difference reception quality information to output.

Figure 17:
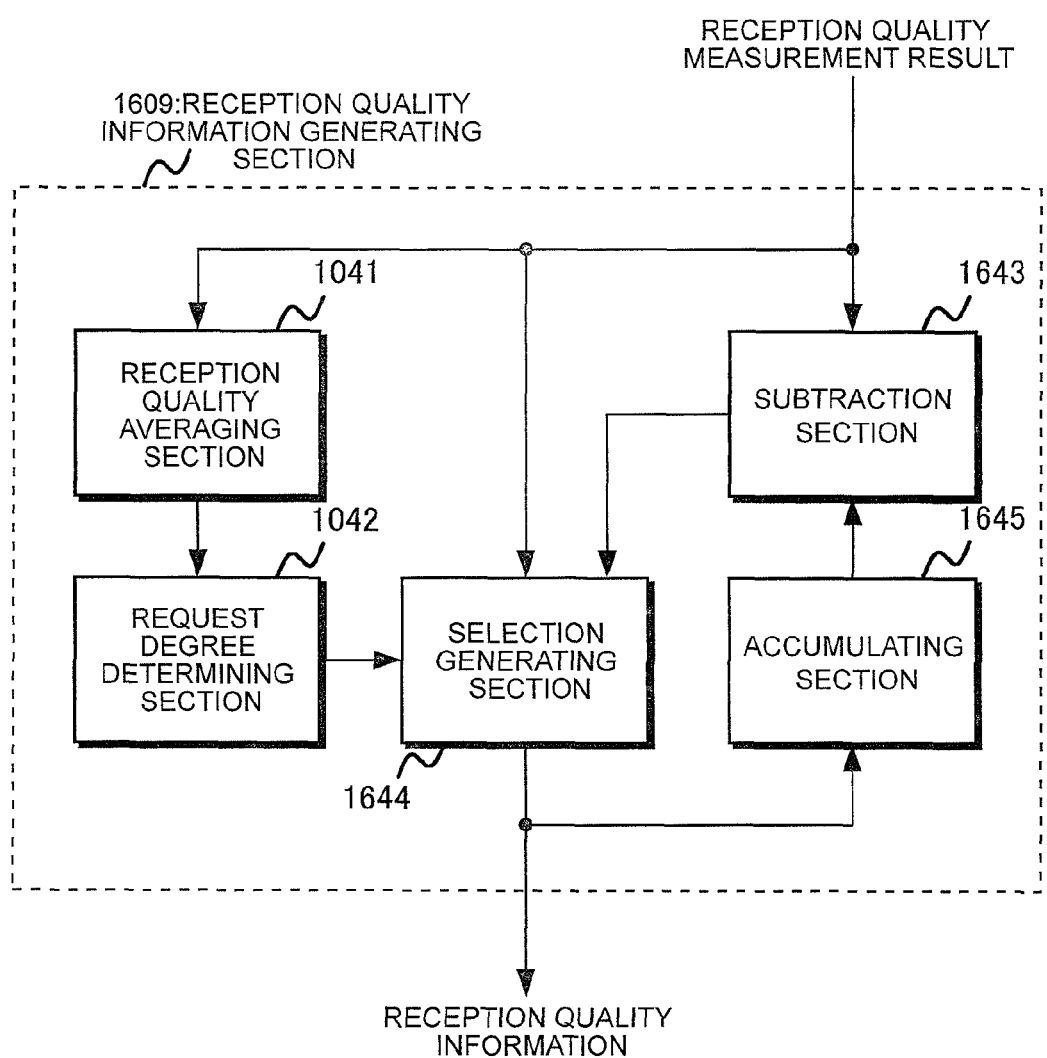
FIG. 17 is a block diagram showing a schematic configuration of a reception quality information generating section in the communication terminal apparatus.

FIG. 17 is a block diagram showing a schematic configuration of the reception quality information generating section 1609 in the communication terminal apparatus 1600. A reception quality measurement result of each subcarrier output from the reception quality measuring section 308 is input to the reception quality averaging section 1041 and subtraction section 1643. The reception quality averaging section 1041 calculates an average value (reception quality average value of each channel) of reception quality measurement results of all the subcarriers belonging to each channel for each channel to output. The request degree determining section 1042 ranks each channel in descending order of the reception quality average value of each channel output from the reception quality averaging section 1041 i.e. in the order in which allocation is requested to the base station apparatus, and outputs the rank of each channel. The subtraction section 1643 calculates a difference value by subtracting a cumulative value output from an accumulating section 1645 from the reception quality measurement result of each subcarrier, and outputs the difference value.

Based on the rank of each channel determined in the request degree determining section 1042, a selection generating section 1644 selects using the non-difference reception quality information or difference reception quality information to notify the reception quality measurement result of each subcarrier in the channel, and for subcarriers such that the section 1644 selects using the non-difference reception quality information to notify, quantizes the reception quality measurement result output from the reception quality measuring section 308 by L0 levels represented by b0 bits (b0 is a natural number) to output as the reception quality information (hereinafter, referred to as "L0 reception quality information"). Meanwhile, for subcarriers such that the section 1644 selects using the difference reception quality information to notify, the section 1644 generates D0 difference reception quality information indicating each difference value input from the subtraction section 1643 by D0 levels represented by b0' bits (b0' is a natural number meeting b0'<b0) to output. Further, the section 1644 adds information for identifying the kind of difference reception quality information selected in each channel to the reception quality information. Alternately, the section 1644 may add information concerning the allocation request degree of each channel.

When the accumulating section 1645 receives the reception quality information generated in the selection generating section 1644, and receives the non-difference reception quality information, the accumulating section 1645 sets a cumulative value at a value indicated by the non-difference reception quality information, while when receiving the difference reception quality information, adds the difference value indicated by the difference reception quality information to the cumulative value and outputs the cumulative value.

Figure 18A:
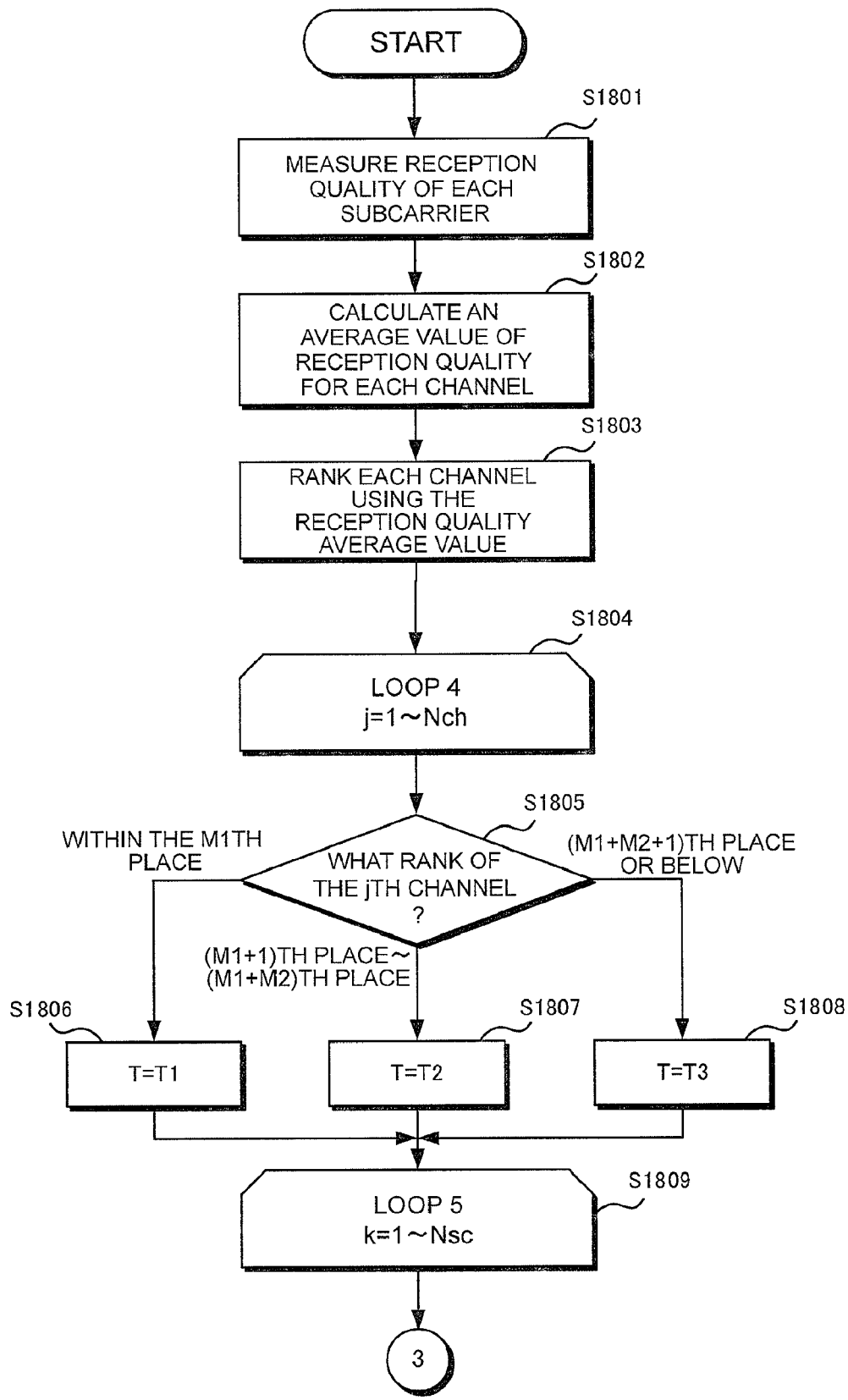
FIG. 18A is a flowchart showing an example of operation of reception quality information generation in the reception quality generating section (and a reception quality measuring section)

FIGS. 18A and 18B are flowcharts showing an example of operation of reception quality information generation in the reception quality information generating section 1609 (and the reception quality measuring section 308). In FIGS. 18A and 18B, the number of all the channels is Nch, the number of subcarriers included in each subcarrier is Nsc, the L0 reception quality information is generated every T1 subcarriers for M1 channels in descending order of reception quality among all the channels, and for the other subcarriers, the D0 difference reception quality information is generated from a difference value obtained by subtracting a cumulative value output from the accumulating section 1645 from a reception quality measurement result of each subcarrier. Further, for next M2 channels, the L0 reception quality information is generated every T2 subcarriers, and for the other subcarriers, the D0 difference reception quality information is generated from the difference value in each subcarrier. For the remaining channels, the L0 reception quality information is generated every T3 subcarriers, and for the other subcarriers, the D0 difference reception quality information is generated from the difference value in each subcarrier. FIGS. 18A and 18B shows an example of the case as described above. In addition, herein, M1 and M2 are positive integers meeting (M1+M2) ≤Nch.

The reception quality information generating operation will specifically be described below with reference to FIGS. 18A and 18B. First, using a pilot symbol output from the demapping section 306, the section 308 measures the reception quality on each subcarrier to output (step S1801). Next, the section 1609 calculates an average value (reception quality average value of each channel) of reception quality measurement results of all the subcarriers belonging to each channel for each channel (step S1302), and ranks each channel in descending order of the calculated reception quality average value of each channel (step S1803). Then, the section 1609 repeats the following processing (loop 4 of steps S1804 to S1817) on each channel.

The section 1609 compares the rank of the jth channel with the numbers M1, M2 of channels (S1805), and when the rank of the jth channel is within the M1th place, T1 is as an interval T of subcarriers to generate the L0 reception quality information (step S1806). Meanwhile, when the rank of the jth channel is in the range of the (M1+1)th place to the (M1+M2)th place, T2 is set as an interval T of subcarriers to generate the L0 reception quality information (step S1807). Alternately, when the rank of the jth channel is the (M1+M2+1)th place or below, T3 is set as an interval T of subcarriers to generate the L0 reception quality information (step S1808). Further, the following processing is repeated on each subcarrier in the loop of each channel (loop 5 of steps S1809 to S1816).

When the kth subcarrier (j, k) of the jth channel is in a position of every T subcarriers in the channel (the remainder of dividing k by T is 0) (Yes in step S1810), the section 1609 quantizes a reception quality measurement result of the subcarrier (j, k) to the L0-level reception quality information to output (step S1811), and sets the quantization result on the cumulative value Dsum (step S1812). In the case of the other subcarriers (the remainder of dividing k by T is any number except 0) (No in step S1810), the section 1609 calculates a difference value Ddiff by subtracting the cumulative value Dsum from a reception quality measurement result of the subcarrier (j, k) (step S1813), selects the difference reception quality information indicative of a value Dcqi nearest the difference value Ddiff from the D0 difference reception quality information to output (step S1814), and adds the value Dcqi indicated by the selected difference reception quality information to the cumulative value Dsum (step S1815).

FIG. 19 is a diagram showing an example of generation results of reception quality information in this Embodiment. FIG. 19 shows an example in the case where used as the non-difference reception quality information is the L0-level reception quality information obtained by quantizing a reception quality measurement result by 16 levels (L0=16, b0=4), used as the difference reception quality information is the same information as the D2 difference reception quality information (D0=4, b0'=2) shown in the example of FIG. 9B as the D0 difference reception quality information, the number of channels is "8" (Nch=8), the number of subcarriers contained in each channel is "4", the L0 reception quality information is notified on all the subcarriers (T1=1) for two channels (M1=2) in descending order of the allocation request degree, the L0 reception quality information is notified every two subcarriers (T2=2) for two channels (M2=2) with next higher allocation request degrees, and the L0 reception quality information is notified every four subcarriers (T3=4) for remaining four channels (Nch−M1−M2=4).

The dotted lines in the graph of FIG. 19 show the SINR (vertical axis on the left side) that is the reception quality measurement result measured in the reception quality measuring section 308, and the alternate long and short dashed lines show an average value of reception quality measurement results of all the subcarriers in each channel. Further, the solid lines show the L0 reception quality information or cumulative value (vertical axis on the right side) generated on each subcarrier. Each channel is ranked in descending order of the reception quality average value of each channel shown by the alternate long and short dashed lines, and the L0 reception quality information is generated on all the subcarriers for channels within the M1th place i.e. first-place channel 4 and second-place channel 5. Further, for channels in the range from the (M+1)th place to the (M1+M2)th place i.e. third-place channel 2 and fourth-place channel 1, the L0 reception quality information is generated on the first and third subcarriers, and on the second and fourth subcarriers, the D0 difference reception quality information is generated that is selected based on a difference value from the L0 reception quality information of the first and third subcarriers, respectively. Furthermore, for each of channels (channel 3, channel 6, channel 7 and channel 8) of the (M1+M2+1)th place or below, the L0 reception quality information is generated on the first subcarrier, and on the second to fourth subcarriers, the D0 difference reception quality information is generated that is selected based on a difference value (from the L0 reception quality information of the first subcarrier on the second subcarrier) from the cumulative value in the adjacent subcarrier.

In the example of FIG. 19, as the number of required bits, this Embodiment provides 96 bits, in contrast to 128 bits (8 channels×4 subcarriers in a channel×4 bits of reception quality information per subcarrier) that are required when the reception quality information of all the subcarriers is generated by the L0-level reception quality information. Further, in contrast to the case of generating the reception quality information only for the predetermined number of channels with excellent reception quality, this Embodiment includes the reception quality information concerning all the subcarriers of all the channels.

Thus, according to this Embodiment, when the communication terminal apparatus 1600 notifies the base station apparatus 1500 of the reception quality information, corresponding to the priority (request degree) of the channel of which downlink allocation the communication terminal apparatus 1600 requests to the base station apparatus 1500, the communication terminal apparatus 1600 selects subcarriers to notify the non-difference reception quality information, and for the subcarriers to notify the non-difference reception quality information, notifies information indicative of a reception quality measurement result as the non-difference reception quality information. Further, for the subcarriers except the aforementioned subcarriers, the apparatus 1600 calculates each difference value from the adjacent subcarrier in the reception quality measurement result of the subcarrier using the non-difference reception quality information as a starting point, and notifies the difference reception quality information indicative of the difference value using the lower number of levels (the number of bits of the difference value) than in the non-difference reception quality information.

Therefore, with respect to channels included in M1 channels with the highest reception quality or below in the downlink in the communication terminal apparatus 1600 i.e. M1 channels with higher priorities for the communication terminal apparatus 1600 to request their allocation to the base station apparatus 1500, the communication terminal apparatus 1600 increases the number of subcarriers to notify by the L0 reception quality information such that information indicative of the reception quality is represented in detail using the high number of levels, the base station apparatus 1500 is thereby able to perform efficient channel (resource block in the channel) allocation and adaptive modulation when the base station apparatus 1500 allocates a channel from the M1 channels to the communication terminal apparatus 1600, and it is possible to actualize transmission at higher speed.

Further, when the base station apparatus 1500 cannot allocate any one of the M1 channels with the highest reception quality in the downlink in the communication terminal apparatus 1600 to the communication terminal apparatus 1600 as a result of scheduling in the base station apparatus 1500, the communication terminal apparatus 1600 has decreased the number of subcarriers to notify the L0 reception quality information as compared with the M1 channels for M2 channels with higher reception quality after the M1 channels i.e. M2 channels with higher priorities to request their allocation after the M1 channels, and for the remaining subcarriers, has notified the D0 difference reception quality information expressing a difference value from the adjacent subcarrier using the lower number of levels than in the L0 reception quality information. By this means, when the base station apparatus 1500 allocates a channel from the M2 channels as a substitute for the M1 channels to the communication terminal apparatus 1600, although efficiency of channel allocation and adaptive modulation is lower than in the M1 channels, it is possible to reduce the information amount of reception quality information.

Meanwhile, when the base station apparatus 1500 cannot allocate any one of the M1 channels or the M2 channels providing the high reception quality in the downlink in the communication terminal apparatus 1600 to the communication terminal apparatus 1600 as a result of scheduling in the base station apparatus 1600, the communication terminal apparatus 1600 has further decreased the number of subcarriers to notify the L0 reception quality information for the other channels, and for the remaining subcarriers, has notified of a difference value from the adjacent subcarrier by the D0 difference reception quality information. Therefore, also when the base station apparatus 1500 allocates a channel from channels except the M1 channels and M2 channels to the communication terminal apparatus 1600, it is possible to ensure transmission by rough adaptive modulation, while reducing the information amount of reception quality information to the lowest.

As described above, according to this Embodiment, while suppressing the notified information amount of reception quality information in the uplink from the communication terminal apparatus, when a channel with a high allocation request degree in the communication terminal apparatus is allocated in data communications in the downlink, it is possible to perform high-speed communications by efficient scheduling and adaptive modulation based on detailed reception quality information from the communication terminal apparatus. Meanwhile, even when the base station apparatus has to allocate a channel with a low allocation request degree in the communication terminal apparatus, the base station apparatus is capable of applying scheduling and adaptive modulation based on rough reception quality information in the communication terminal apparatus. Further, in the case where the reception quality measurement result varies abruptly, it is feared that the cumulative error increases when only the difference value is notified. However, according to this Embodiment, since the so-called raw data is notified, it is possible to decrease the effect of the cumulative error.

In addition, this Embodiment describes the example of selecting the number of subcarriers to notify the non-difference reception quality information (L0 reception quality information) in each channel corresponding to the allocation request degree of the channel, and may be configured to further select the number of levels (the number of bits) of the difference reception quality information to generate for the remaining subcarriers.

Embodiment 4

In each of the above-mentioned Embodiments, the OFDM system is assumed, and descriptions are made while assuming that a channel means one or a plurality of subcarriers. In this Embodiment, the case is described that one or a plurality of subcarriers of each transmission antenna is assumed to be a channel on an example of application methods in a MIMO (Multiple Input Multiple Output)-OFDM system.

Figure 20:
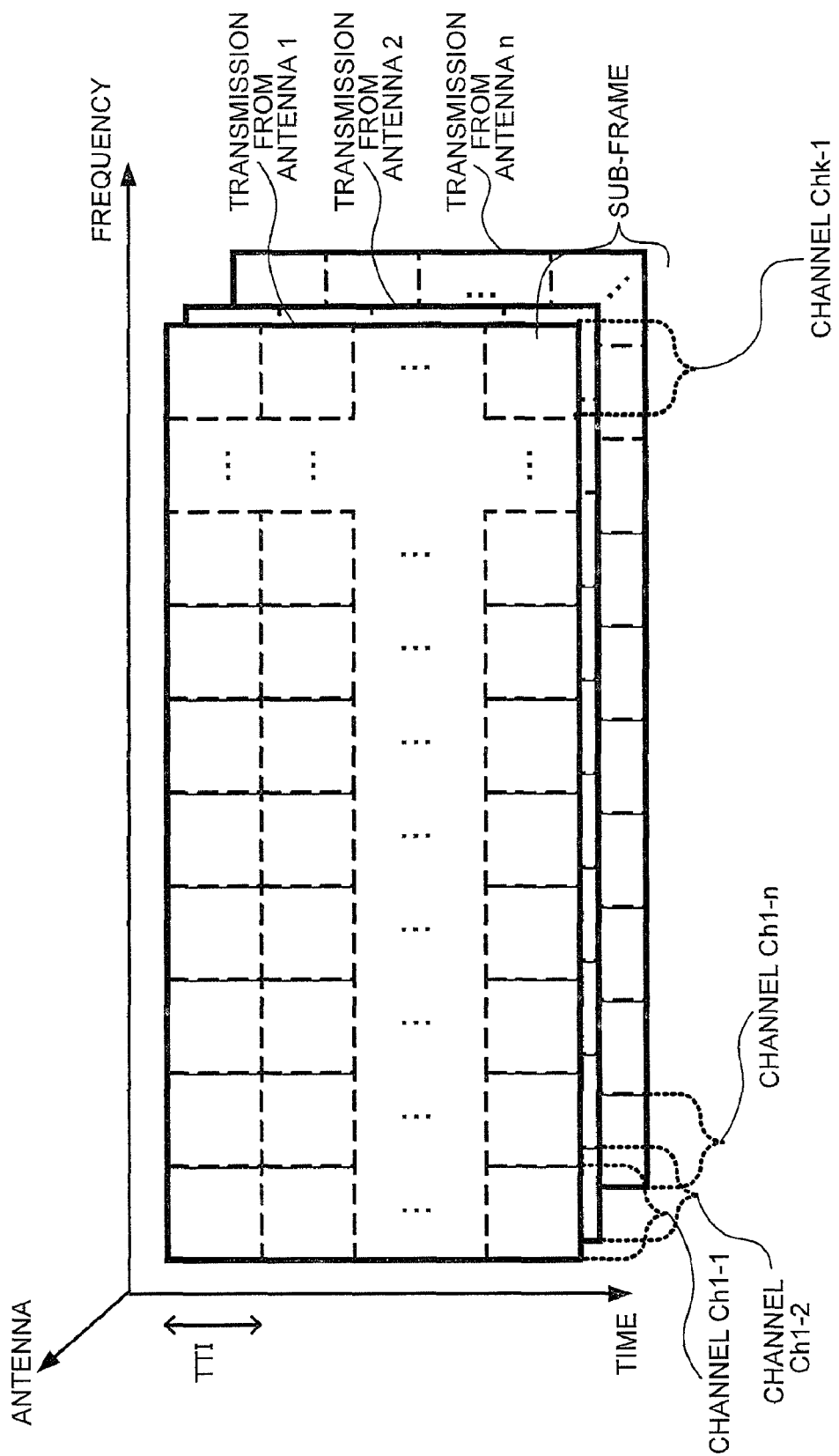
FIG. 20 is a diagram showing an example of a sub-frame structure in the downlink in Embodiment 4.

FIG. 20 is a diagram showing an example of a sub-frame structure in the downlink in this Embodiment. A base station apparatus transmits different signals from A (A is an integer of 2 or more) transmission antennas. The sub-frame contains A regions respectively transmitted from antennas 1 to A, and each region is further divided into K (K is a natural number) regions in the frequency direction. It is assumed that these A×K regions are a channel, and that the sub-frame is a transmission unit, and is a range to perform channel allocation in a single time of scheduling. Further, the sub-frame is divided into T (T is a natural number) by a predetermined time interval TTI (Transmission Time Interval) in the time-axis direction, and one TTI in a channel is assumed to be a scheduling unit (resource block).

Also in the MIMO-OFDM system with such a sub-frame structure, the same processing as in each of the above-mentioned Embodiments can be applied except that regions indicated by terms of a channel or resource block are different.

As described above, in the system for performing communications using a plurality of channels in a sub-frame, the invention is applicable to systems with a possibility that reception quality of each channel is different in each communication terminal apparatus, and by selecting the detail degree and the information amount of reception quality information in the uplink corresponding to the allocation request degree of each channel in the communication terminal apparatus, it is possible to apply efficient scheduling and adaptive modulation.

As described above, in each of the above-mentioned Embodiments, the invention is described using SINR calculated based on a pilot symbol as reception quality, in the cellular system where:

(1) a transmission system is a multicarrier transmission system (particularly, OFDM transmission system);

(2) a channel is configured to contain at least one subcarrier;

(3) a unit of reception quality information and adaptive modulation is a subcarrier; and (4) adaptive scheduling (channel allocation) is performed for each channel or for each resource block obtained by further dividing a channel in the time direction.

However, the modulation scheme, channel configuration, unit of reception quality information and adaptive modulation, adaptive scheduling (channel allocation) and reception quality to which the invention is applicable are not limited to the foregoing. The invention is applicable to other systems for performing communications using a plurality of channels with a possibility that the reception quality varies with channels, for example, where the transmission system is an MC-CDMA system (Multi Carrier-Code Division Multiple Access) system using spreading techniques, and a unit of adaptive modulation and adaptive scheduling is a plurality of channels indicated by a transmission antenna or specific mode in SDMA (Space Division Multiple Access) such as MIMO (Multiple Input Multiple Output), a plurality of code channels in CDMA, or a channel as a combination thereof.

Further, as the reception quality information, it is possible to use indicators such as RSSI (Received Signal Strength Indicator), SNR, SIR (Signal to Interference power Ratio), CNR (Carrier to Noise power Ratio), CIR (Carrier to Interference power Ratio) and CINR (Carrier to Interference plus Noise power Ratio) indicating the reception quality in relation to the received signal power and carrier power. Furthermore, as the indicator, any indicators can be used, as long as the indicators are related to the transmission speed, such as a modulation parameter selected corresponding to transmission path conditions, for example, a modulation parameter of MCS (Modulation and Coding Scheme) that is a combination of the modulation scheme and channel coding rate, transmission rate, etc. Moreover, a unit of reception quality information and adaptive modulation may be a subcarrier group comprised of one or more subcarriers in a channel.

Further, each of the above-mentioned Embodiments describes the case of notifying the reception quality information on all the channels, but may be configured not to notify even the roughest reception quality information (L3 reception quality information, D3 difference reception quality information, etc. in each of the above-mentioned Embodiments) for a group of channels with the lowest channel allocation degree, or to notify only an average value of the reception quality.

Furthermore, each of the above-mentioned Embodiments describes the example of using an average value of reception quality measurement results of subcarriers in a channel as a criterion of ranking of each channel, but the invention is not limited thereto, and ranking of each channel may be performed using a median value, mode, minimum value or the like of reception quality measurement results of subcarriers in a channel as a criterion. Still furthermore, each of the above-mentioned Embodiments describes the reception quality information expressed by three different numbers of bits, or reception quality information indicated by a combination of three different kinds of non-difference reception quality information and difference reception quality information, and the invention is applicable to communication terminal apparatuses for selecting from among two or more different numbers of bits, or the reception quality information indicated by the combination according to the channel allocation request degree.

Moreover, it is assumed in each of the above-mentioned Embodiments that a communication system adopts FDD (Frequency Division Duplex) comprised of a base station apparatus and communication terminal apparatuses, an adaptive modulation system of OFDM is applied in downlink communications, and a system where OFDM and adaptive modulation is not performed is applied in uplink communications, but the invention is not limited thereto. Further, the invention is applicable to radio communication apparatuses in the relationship that any one of a plurality of radio communication apparatuses performs the scheduling function and adaptive modulation and that the other radio communication apparatuses are capable of performing the reception quality information transmission function.

In addition, for two radio communication apparatuses, the descriptions are made where the communication terminal apparatus is a side (side having the reception quality information transmission function) of notifying the reception quality information of channels, and the base station apparatus is a side (side of performing the scheduling function) of allocating transmission data to each communication terminal apparatus to each channel based on the notified reception quality information to perform adaptive modulation, but a single radio communication apparatus may have both the functions.

In this description, the communication apparatus is an apparatus for performing radio communications, and includes the base station apparatus, communication terminal apparatus, radio apparatus, portable communication terminal apparatus, cellular telephone and the like.

The invention claimed is:

1. A communication apparatus applied to a multicarrier communication scheme in which the apparatus receives a signal on a channel allocated by a communicating party among a plurality of channels each comprised of at least one subcarrier, measures reception quality of the received signal, and notifies the communicating party of reception quality information, comprising:

a reception quality measuring section that measures reception quality of each subcarrier, and a reception quality information generating section which determines an allocation request degree of each channel with respect to the communicating party, selects an information amount to represent reception quality information for each channel based on the allocation request degree, and based on a measurement result of the reception quality, generates the reception quality information represented by the selected information amount.

2. The communication apparatus according to claim 1, wherein the reception quality information generating section has a request degree determining section that determines an allocation request degree of each channel with respect to the communicating party based on the measured reception quality, and a selection generating section which selects an information amount to represent reception quality information for each channel based on the allocation request degree, and generates the reception quality information represented by the selected information amount based on the measurement result of the reception quality for each subcarrier group comprised of at least one subcarrier belonging to each channel.

3. The communication apparatus according to claim 2, wherein the reception quality information generating section has a reception quality averaging section that calculates either one of an average value, a median value, a mode and a minimum value of reception quality measurement results of all subcarriers belonging to each channel, and the request degree determining section increases the allocation request degree of each channel as the average value, the median value, the mode or the minimum value is higher.

4. The communication apparatus according to claim 2, wherein the selection generating section generates reception quality information with a larger information amount for a channel such that the allocation request degree is higher.

5. The communication apparatus according to claim 4, wherein the selection generating section increases the number of bits per subcarrier group for a channel such that the allocation request degree is higher, and generates the reception quality information by quantizing the measurement result of the reception quality corresponding to the number of bits.

6. The communication apparatus according to claim 4, wherein as the reception quality information, the selection generating section generates non-difference reception quality information by quantizing the measurement result of the reception quality for at least one beforehand determined subcarrier group, and for other subcarrier groups, generates difference reception quality information indicating a difference value from an adjacent subcarrier group in the measurement result of the reception quality using the higher number of bits as the allocation request degree of a channel to which the subcarrier groups belong is higher.

7. The communication apparatus according to claim 4, wherein as the reception quality information, the selection generating section generates non-difference reception quality information obtained by quantizing the measurement result of the reception quality, and difference reception quality information indicating a difference value from an adjacent subcarrier group in the measurement result of the reception quality for each subcarrier group, and selects the higher number of subcarrier groups to generate the non-difference reception quality information for a channel such that the allocation request degree is higher.

8. The communication apparatus according to claim 7, wherein the selection generating section makes the number of bits representing the difference reception quality information lower than the number of bits representing the non-difference reception quality information.

9. A multicarrier communication system comprised of a communication control apparatus that allocates a channel to a communication terminal apparatus from among a plurality of channels each comprised of at least one subcarrier, and the communication terminal apparatus that receives a signal on the channel allocated by the communication control apparatus, measures reception quality of the received signal, and notifies the communication control apparatus of reception quality information,
wherein the communication terminal apparatus measures reception quality of each subcarrier, determines an allocation request degree of each channel with respect to the communication control apparatus, selects an information amount to represent reception quality information for each channel based on the allocation request degree, generates the reception quality information represented by the selected information amount based on a measurement result of the reception quality for each subcarrier group comprised of at least one subcarrier belonging to each channel, and notifies the communication control apparatus of the generated reception quality information.

10. A communication method in a multicarrier communication system comprised of a communication control apparatus that allocates a channel to a communication terminal apparatus from among a plurality of channels each comprised of at least one subcarrier, and the communication terminal apparatus that receives a signal on the channel allocated by the communication control apparatus, measures reception quality of the received signal, and notifies the communication control apparatus of reception quality information, wherein
the communication terminal apparatus measures reception quality of each subcarrier, determines an allocation request degree of each channel with respect to the communicating control apparatus,
selects an information amount to represent reception quality information for each channel based on the allocation request degree,
generates the reception quality information represented by the selected information amount based on a measurement result of the reception quality for each subcarrier group comprised of at least one subcarrier belonging to each channel, and
notifies the communication control apparatus of the generated reception quality information.

11. The communication apparatus according to claim 3, wherein the selection generating section generates reception quality information with a larger information amount for a channel such that the allocation request degree is higher.

* * * * *